United States Patent
O'Brien et al.

(10) Patent No.: US 11,656,375 B2
(45) Date of Patent: May 23, 2023

(54) MEASURING HYDROPHONE CHANNEL IMPEDANCE USING A TEST SIGNAL GENERATOR COUPLED IN SERIES

(71) Applicant: Magseis FF LLC, Houston, TX (US)

(72) Inventors: Tom O'Brien, Houston, TX (US); Michael Morris, Houston, TX (US); Peter Weatherall, Houston, TX (US)

(73) Assignee: Magseis FF LLC, Houston, TX (US)

( * ) Notice: Subject to any disclaimer, the term of this patent is extended or adjusted under 35 U.S.C. 154(b) by 618 days.

(21) Appl. No.: 16/707,410

(22) Filed: Dec. 9, 2019

(65) Prior Publication Data

US 2021/0173105 A1 Jun. 10, 2021

(51) Int. Cl.
*G01V 13/00* (2006.01)
*G01V 1/18* (2006.01)

(52) U.S. Cl.
CPC .............. *G01V 1/186* (2013.01); *G01V 13/00* (2013.01)

(58) Field of Classification Search
CPC .............. G01V 1/186; G01V 1/164; G01V 2210/1427; G01V 13/00; G01V 2200/14
See application file for complete search history.

(56) References Cited

U.S. PATENT DOCUMENTS

| | | | | |
|---|---|---|---|---|
| 4,242,741 A | * | 12/1980 | Parrish | G01V 1/22 330/84 |
| 4,290,123 A | * | 9/1981 | Pickens | G01V 13/00 367/19 |
| 6,208,584 B1 | * | 3/2001 | Skinner | G01V 1/186 367/13 |
| 6,288,975 B1 | * | 9/2001 | Frederick | G01V 1/186 181/102 |
| 2010/0097886 A1 | * | 4/2010 | Day | G01V 1/364 367/24 |
| 2011/0110186 A1 | * | 5/2011 | Tulett | G01V 13/00 367/13 |

(Continued)

FOREIGN PATENT DOCUMENTS

CN 204334485 U * 5/2015
WO WO-2015164924 A1 * 11/2015 ......... G01R 1/06788

OTHER PUBLICATIONS

CN-204334485-U translation (Year: 2015).*

(Continued)

*Primary Examiner* — Daniel L Murphy
*Assistant Examiner* — Amie M Ndure
(74) *Attorney, Agent, or Firm* — Sage Patent Group

(57) ABSTRACT

Systems, apparatuses, and method of measuring hydrophone impedance are provided herein. A sensor can convert an acoustic wave received via a liquid medium into an electric signal. A signal encoder can be coupled with the sensor to receive the electric signal. A test signal generator can be coupled in series with the sensor and the signal encoder and can generate a test signal. The test signal can measure an impedance of the sensor. A switch component can be coupled in series with the sensor, the signal encoder, and the test signal generator. The switch component can route the test signal to a first terminal of the sensor and through a second terminal of sensor during a first operational state. The switch component can route the test signal to the second terminal of the sensor and through the first terminal of sensor during a second operational state.

20 Claims, 14 Drawing Sheets

(56) References Cited

U.S. PATENT DOCUMENTS

| | | | | |
|---|---|---|---|---|
| 2011/0310698 A1* | 12/2011 | Maples | ............... | G01V 1/184 |
| | | | | 367/20 |
| 2012/0069704 A1* | 3/2012 | Cambois | ............. | G01V 1/3835 |
| | | | | 367/21 |
| 2015/0219776 A1* | 8/2015 | Fernihough | ............ | G01V 1/186 |
| | | | | 367/149 |
| 2015/0260878 A1* | 9/2015 | Bell | ..................... | G01V 13/00 |
| | | | | 367/13 |
| 2016/0299242 A1* | 10/2016 | Nance | ................... | G01H 11/08 |
| 2017/0343687 A1* | 11/2017 | Griffin | ................... | G01V 1/201 |

OTHER PUBLICATIONS

Cao et al., "Method of on-line Resistance and Capacitance Measurement of Piezoelectric Ceramic Hydrophones", The Ninth International Conference on Electronic Measurement & Instruments, ICEMI'2009, pp. 2-535 to 2-539 (5 pages).
International Search Report and Written Opinion for PCT PCT/US2020/062867 dated Mar. 22, 2021 (16 pages).
Wu et al., "A High Density and Precise Streamer Cable Digitizer for Marine Seismic Exploration System", 2010 Second IITA International Conference on Geoscience and Remote Sensing, 2010 IEEE, GRS2010, pp. 548-551 (4 pages).
"DAC1282 Low Distortion Digital-to-Analog Converter for Seismic," Texas Instruments, May 2015 (47 pages).

* cited by examiner

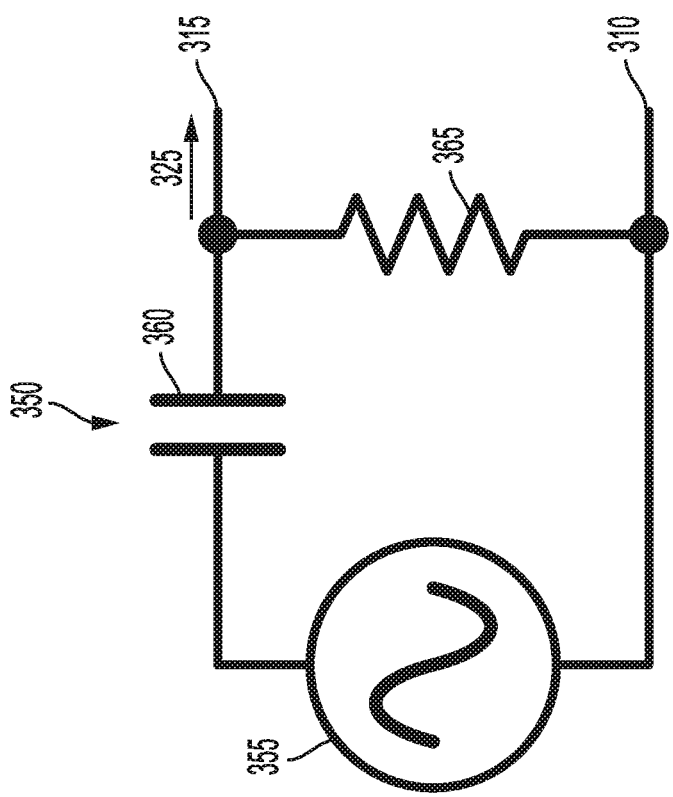
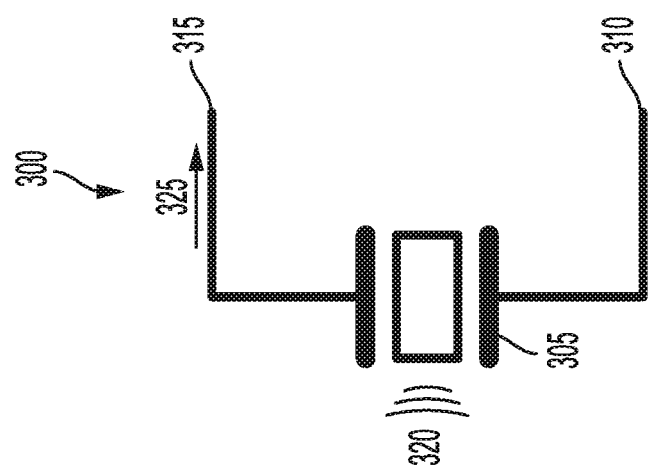
FIG. 3

MEASURING HYDROPHONE CHANNEL IMPEDANCE USING A TEST SIGNAL GENERATOR COUPLED IN SERIES

BACKGROUND

Electrical impedance can measure an amount of opposition to a current brought upon by an electrical circuit or a component against an electrical current. Measuring the electrical impedance can be used to gauge the performance of the electrical circuit or the component.

SUMMARY

At least one aspect of the present disclosure is directed to a system to measure hydrophone impedance. The system can include a sensor to convert an acoustic wave received via a liquid medium into an electric signal. The sensor can have a first polarity terminal and a second polarity terminal having a polarity opposite of the first polarity terminal. The system can include a signal encoder coupled with the sensor to receive the electric signal converted by the sensor. The system can include a test signal generator coupled in series with the sensor and the signal encoder to generate a test signal to send through the sensor and the signal encoder. The test signal can measure an impedance of the sensor. The system can include a switch component coupled in series with the sensor, the signal encoder, and the test signal generator. The switch component can have a first operational state and a second operational state. The switch component can route the test signal from the test signal generator to the first polarity terminal of the sensor, through the second polarity terminal of sensor, and to the signal encoder in response to the switch component set to the first operational state. The switch component can route the test signal from the test signal generator to the second polarity terminal of the sensor, through the first polarity terminal of sensor, and to the signal encoder in response to the switch component set to the second operational state.

At least one aspect of the present disclosure is directed to a method of measuring hydrophone impedance. The method can include generating, by a test signal generator, a test signal to send through a sensor and a signal encoder to measure an impedance of the sensor. The sensor can convert an acoustic wave to an electric signal. The sensor can have a first polarity terminal and a second polarity terminal having a polarity opposite of the first polarity terminal. The signal encoder can be coupled in series with the sensor to receive the electric signal. The method can include routing, by a switch component coupled in series with the sensor, the signal encoder, and the test signal generator, the test signal from the test signal generator to the first polarity terminal of the sensor, through the second polarity terminal of sensor, and to the signal encoder in response to the switch component set to a first operational state. The method can include routing, by the switch component, the test signal from the test signal generator to the second polarity terminal of the sensor, through the first polarity terminal of sensor, and to the signal encoder in response to the switch component set to a second operational state.

At least one aspect of the present disclosure is directed to an apparatus to measure hydrophone impedance. The apparatus can include a housing. The apparatus can include a hydrophone channel disposed in the housing. The hydrophone channel can include a sensor to convert an acoustic wave received via a liquid medium into an electric signal. The hydrophone channel can include an input channel coupled with a signal encoder. The input channel can be coupled in parallel with the sensor to receive the electric signal from the sensor. The hydrophone channel can include an input filter network coupled in series between the sensor and the signal encoder to pass the electric signal received from the sensor to the signal encoder. The apparatus can include a test signal generator disposed in the housing. The test signal generator can be coupled in series with the hydrophone channel between the sensor and the input filter network. The test signal generator can generate a test signal to send through the hydrophone channel. The test signal can measure an impedance of the sensor. The apparatus can include a switch component disposed in the housing. The switch component can be coupled in series between the sensor and the signal encoder of the hydrophone channel. The switch component can have a first operational state and a second operational state. The switch component can route the test signal from the test signal generator through the hydrophone channel in a first path in response to the switch component set to the first operational state. The switch component can route the test signal from the test signal generator through the hydrophone channel in a second path in response to the switch component set to the second operational state At least one aspect of the present disclosure is a method of providing an electronic circuit to measure hydrophone. The method can include providing an electronic circuit disposed in a housing. The electronic circuit can include a hydrophone channel. The hydrophone channel can include a sensor to convert an acoustic wave received via a liquid medium into an electric signal. The hydrophone channel can include an input channel coupled with a signal encoder. The input channel can be coupled in parallel with the sensor to receive the electric signal from the sensor. The hydrophone channel can include an input filter network coupled between the sensor and the signal encoder to pass the electric signal received from the sensor to the signal encoder. The electronic circuit can include a test signal generator coupled in series with the hydrophone channel between the sensor and the input filter network. The test signal generator can generate a test signal to send through the hydrophone channel. The test signal can measure an impedance of the sensor. The electronic circuit can include a switch component coupled in series between the sensor and the signal encoder of the hydrophone channel. The switch component can have a first operational state and a second operational state. The switch component can route the test signal from the test signal generator through the hydrophone channel in a first path in response to the switch component set to the first operational state. The switch component can route the test signal from the test signal generator through the hydrophone channel in a second path in response to the switch component set to the second operational state These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 3 depicts a circuit diagram of an example sensor to convert acoustic waves traveling through liquid to electric signals;

DETAILED DESCRIPTION

Figure 1:
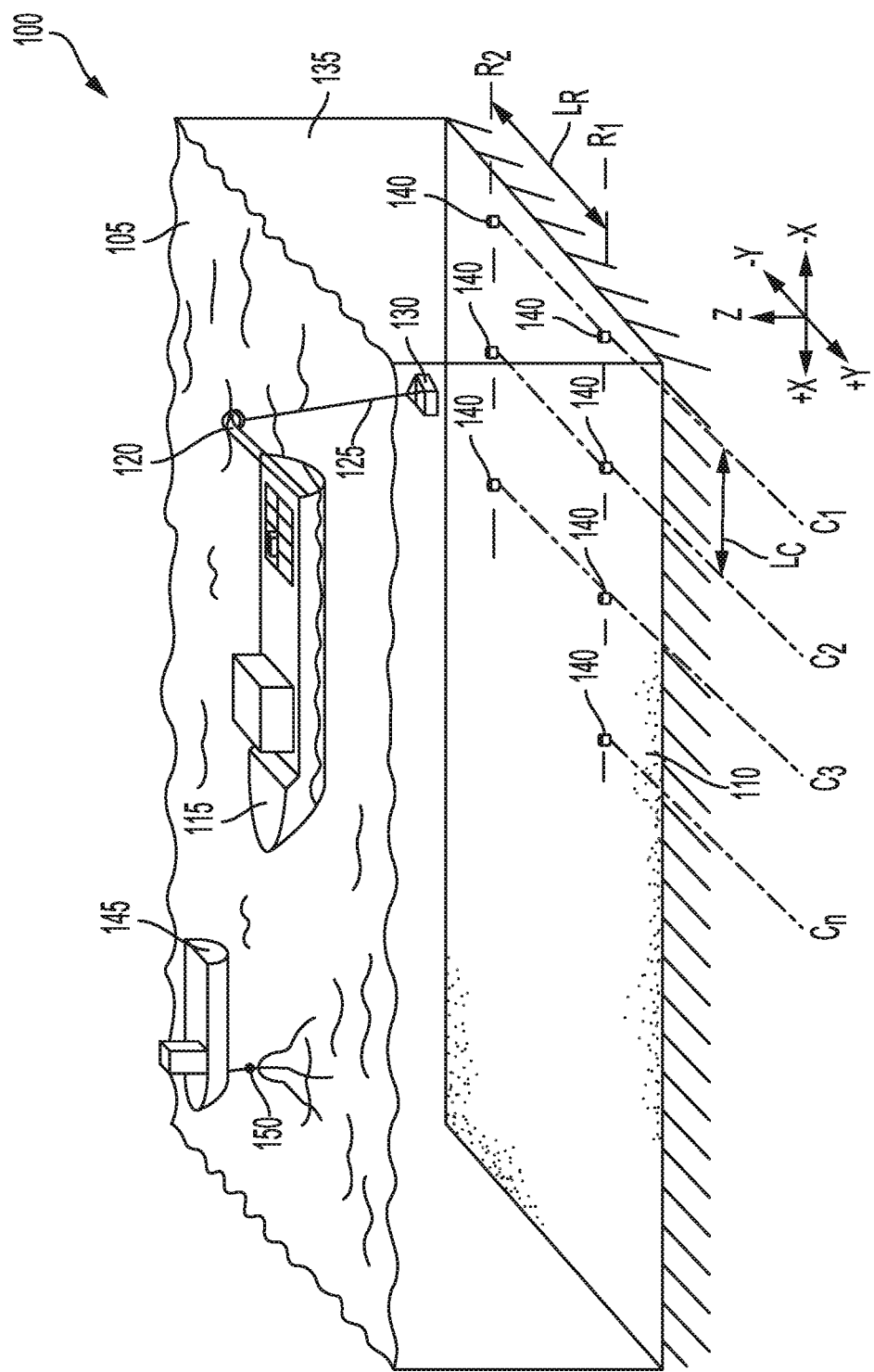
FIG. 1 depicts an isometric view of an example environment of a seismic operation in deep water.

Following below are more detailed descriptions of various concepts related to and implementations of systems, apparatuses, electronic circuits, and methods of measuring hydrophone impedances. The various concepts introduced above and discussed in greater detail below can be implemented in any numerous ways.

In underwater seismic data acquisition systems, a series of seismic data acquisition units (also referred herein as nodes) can be deployed from a marine vessel onto a seabed, (which can include a lakebed). Each node can acquire seismic data relating to subsurface features, such as lithological formations or fluid layers correlated with the presence of hydrocarbons, minerals, or other elements. In acquiring the seismic data, an acoustic signal can be emitted from a source (e.g., an air gun array) through the water column to propagate through the water and pass through the seabed and into the earth beneath. The acoustic signal can reflect or refract off of the various subsurface features back toward the surface of the earth.

The nodes arranged along the surface can receive the returning acoustic signals, and produce seismic readings from the acquired signals to detect the presence or absence of lithological formations beneath the surface. To acquire the acoustic signals, each node can be equipped with one or more hydrophones, such a piezoelectric sensor. The receiving end of the hydrophone can be in contact or mechanically coupled with the water, and can have an impedance matching the acoustic impedance of the water to receive the incoming acoustic wave. Each hydrophone may be part of a hydrophone channel that can include other electrical circuitry and components (e.g., an input filter). The hydrophone can convert changes in water pressure resulting from the incoming acoustic wave into an electric signal to pass to the remainder of the channel. A signal encoder within the node can be coupled in parallel with the hydrophone channel, and can receive the converted electric signal from the hydrophone to convert the electric signal to a digitized data series. Additional processing hardware coupled with the signal encoder and the hydrophone channel can generate seismic data and perform various other functions using the data from the hydrophone channel.

Over time and use, the performance of the hydrophones in the nodes may deteriorate, leading to the degradation of the readings of seismic data produced by the node or inability to produce any useful data. For example, the wiring within the hydrophone may have broken down, thereby causing the impedance of the hydrophone to deviate from the expected amount. The ceramic end cap of a hydrophone in contact to the water may eventually crack with repeated applications of the acoustic signal, resulting in inability to convert the acoustic signal to an electric signal. In some cases, the hydrophone can have weak or poor performance from the outset, due to manufacturing defects with the hydrophone or other components of the hydrophone channel.

Finding the causes to the degraded or weak performance in the hydrophone of the node may be difficult. For one, many hydrophones may have no readily discernable physical defect such as short or an open circuit within the hydrophone channel. For another, some hydrophones may suffer from a high dissipation factor (e.g., greater than 0.006) or a large leakage resistance (e.g., greater than 0.1 µA when 27 volts DC is applied prior to installing the hydrophones in the node). A dissipation factor greater than 0.006 can indicate that the hydrophone is degraded. Even among the hydrophones with high dissipation factors or leakage resistance, the detrimental operating characteristic may be apparent when measured using test electrical currents of certain frequencies (e.g., at 0 Hz to 50 Hz).

The performance of a hydrophone can be gauged by measuring an electrical impedance of the hydrophone. The electrical impedance of the hydrophone can correspond to an amount of opposition that an electrical current traveling through the hydrophone faces, and can be measured in Ohms ($\Omega$). One approach to measure the impedance of the hydrophone can include coupling a test signal generator circuit in parallel with the hydrophone channel. The test signal generator can generate a test signal for measuring the impedance of the hydrophone. The test signal generator can emit the test signal to propagate through one of the terminals of the hydrophone and through the remainder of the hydrophone channel to the signal encoder. The output signal from the hydrophone channel at the signal encoder and the input test signal can be used to measure the impedance.

One problem arising from the parallel configuration of the test signal generator can include the introduction of additional impedance into the hydrophone channel. With this configuration, the input channel of the signal encoder can function as a voltage divider between the test signal generator and a parallel combination of the hydrophone and the hydrophone channel. The impedance introduced by the test signal generator can range from approximately 250$\Omega$ to 350$\Omega$, whereas the parallel combination of the hydrophone and channel can be on the order of $10^6 \Omega$ (1 M$\Omega$). The addition of impedance and the parallel configuration can result in lower sensitivity to the measurement of hydrophone impedance using the test signal. For example, when the leakage resistance reaches above 100 kΩ, the change to the impedance of the hydrophone can be readily detected using the test signal at a frequency of 31.52 Hz. Below this amount of resistance, the changes to the impedance of the hydrophone may not be found.

Furthermore, with the parallel input configuration, the signal input to the channel can be the result of the test signal input and the voltage divider formed by the test signal generator output impedance and the channel input impedance. With a channel input impedance of 1 MΩ and a test signal generator output impedance of 1 kΩ, a 90% decrease in input impedance (from 1 MΩ to 100 kΩ) can result in a less than 1% change in the channel voltage input. This provides poor measurement resolution in the area where the hydrophone impedance is transitioning from in-spec to out of spec. The parallel configuration of the testing circuitry with the hydrophone channel can thus lead to the inability to discern between differing levels of degradation in the hydrophone. As such, whether the performance of the hydrophone is degrading can be deduced at a later point in the lifespan of the node.

To measure the hydrophone impedance more precisely and accurately, the test signal generator can coupled in series with the hydrophone channel between the hydrophone and the remainder of the channel using a switch component. The switch component can have multiple modes of operation set by a switch control unit to control the flow of signals through the hydrophone channel. Under a normal operation mode, the switch component can disconnect the test signal generator from the hydrophone channel. With the disconnection, the switch component permit the electric signal converted by the sensor from the acoustic signal to pass through the hydrophone channel to the signal encoder for additional processing.

In addition, the switch component can connect the test signal generator with the hydrophone channel in series to convey the test signal. In connecting the test signal generator with the hydrophone channel, the switch component can route the test signal generated by the test signal generator in a first or a second direction through the hydrophone channel. Under one testing operation mode, the switch component can route the test signal from the test signal generator first through one terminal (e.g., a positive terminal) of the sensor via the hydrophone channel to the signal encoder. Under another testing operation mode, the switch component can route the test signal from the test signal generator first through the opposite terminal (e.g., a negative terminal) of the sensor via the hydrophone channel to the signal encoder.

By coupling in series under testing operation modes, the test signal generator can function as the voltage divider directly between the hydrophone channel and hydrophone. In this manner, the impedance of the hydrophone can be measured using a lower frequency for the test signal, thereby allowing for finer and more sensitive measurements of the hydrophone. Furthermore, with these two testing operation modes, a dual polarity measurement of the impedance of the hydrophone can be performed on the hydrophone channel. By performing the dual polarity measure, whether the hydrophone is balanced or imbalanced can be determined. As such, whether the performance of the hydrophone is degrading can be determined at an earlier point in the lifespan of the node than with the parallel configuration.

FIG. 1, among others, depicts an isometric view of an environment 100 for a seismic operation in deep water. The environment 100 can include a body of water 105, such as an ocean, a sea, a lake, a gulf, a bay, or a river, among others. The environment 100 can include an underwater surface 110 beneath the water 105. The surface 110 can correspond to a floor of the body of water 105, such as an ocean floor, a seabed, or a lakebed, among others. Beneath the surface 110, the environment 100 can include lithological formations or fluid layers correlated with the presence of hydrocarbons, minerals, or other elements.

The environment 100 can include at least one first vessel 115. The first vessel 115 can be a watercraft, such as a boat, a transport, a tanker, a merchantman, a tugboat, a submarine, among others. The first vessel 115 can be on a surface of the water 105 (e.g., as depicted) or within the water 105. The first vessel 115 can include at least one crane 120 with at least one cable 125 and at least one transfer mechanism 130 attached at an end of the cable 125. The transfer mechanism 130 can be a container, a hamper, a carrier, a skid structure, a basket, or any component capable of holding and transporting an object. The environment 100 can include a set of apparatuses 140 to acquire seismic data (also referred herein as a seismic sensor device, a seismic data acquisition unit, or a node) arranged along the surface 110 beneath the water 105. Each apparatus 140 can be initially transported by the first vessel 115. Once the first vessel 115 is positioned on the surface of the water 105 along a water column 135, each apparatus 140 can be loaded onto the transfer mechanism 130. The transfer mechanism 130 holding the apparatus 140 be lowered to a position on the surface 110 beneath the water 105 via the crane 120 and the cable 125. Upon reaching the surface 110, the transfer mechanism 130 can unload or situate the apparatus 140 at the position on the 125 surface 110.

The set of apparatuses 140 can be placed on the surface 110 in selected locations, such as a plurality of rows Rn in the X direction (R1 and R2 are shown) or columns Cn in the Y direction (C1-Cn are shown), wherein n equals an integer. The rows Rn and columns Cn can define a grid or array, wherein each row Rn (e.g., R1-R2) comprises a receiver line in the width of a sensor array (X direction) or each column Cn comprises a receiver line in a length of the sensor array (Y direction). The distance between adjacent apparatuses 140 in the rows is shown as distance LR and the distance between adjacent apparatuses 140 in the columns is shown as distance LC. While a substantially square pattern is shown (e.g., as depicted), other patterns may be formed on the surface 110. Other patterns include non-linear receiver lines or non-square patterns. The pattern(s) may be predetermined or result from other factors, such as topography of the surface 110. The distances LR and LC can be substantially equal and may include dimensions between about 60 meters to about 400 meters, or greater. The distance between adjacent apparatuses 140 may be predetermined or result from topography of the surface 110.

Figure 2:
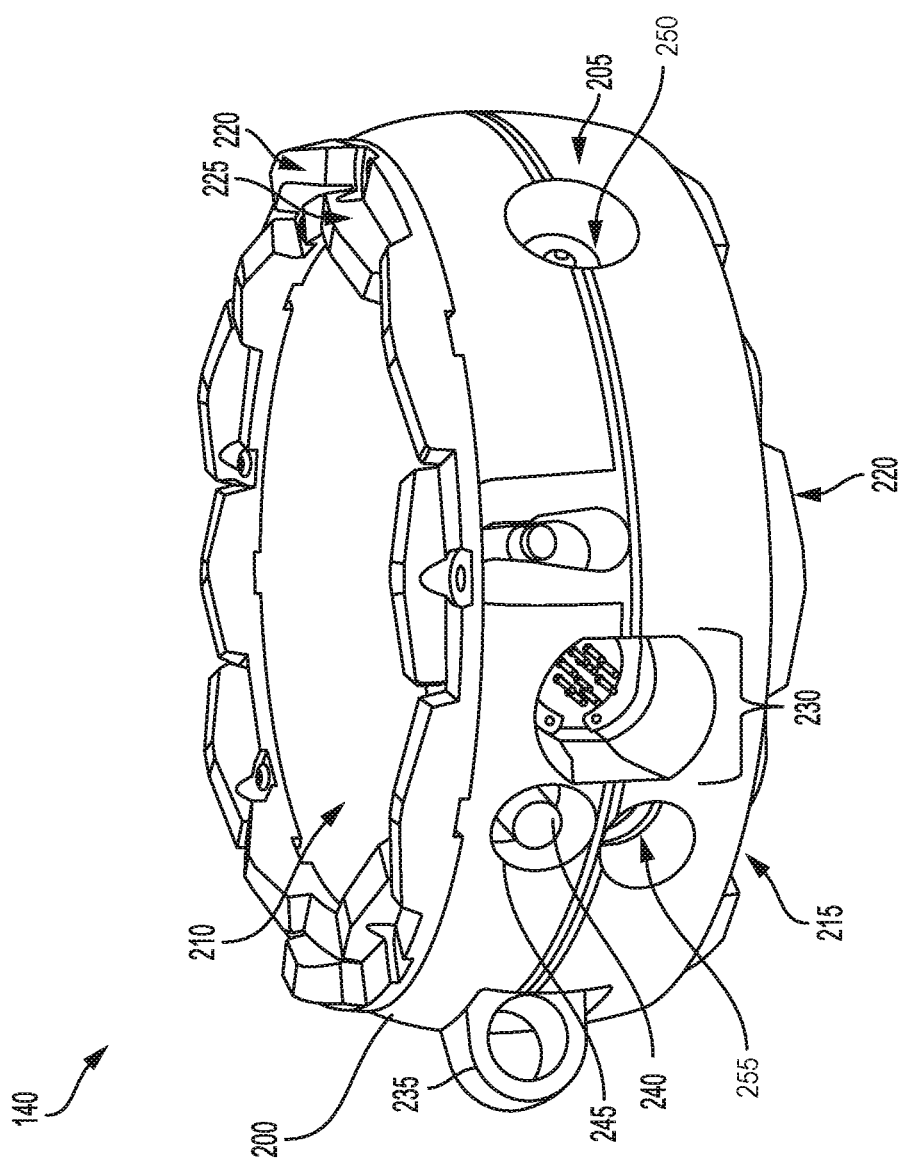
FIG. 2 depicts an isometric view of an example apparatus to acquire seismic data.

The environment 100 can include at least one second vessel 145. The second vessel 145 can be a watercraft, such as a boat, a transport, a tanker, a merchantman, a tugboat, a submarine, among others. The second vessel 145 can be on a surface of the water 105 (e.g., as depicted) or within the water 105. The second vessel 145 can include at least one acoustic source device 150 (e.g., an air gun array) to perform a seismic survey. The first vessel 115 can also include the acoustic source device 150 to perform the seismic survey. With the placement of the apparatuses 140 along the surface 110 beneath the water 105, the acoustic source device 150 on the second vessel 145 can emit acoustic signals toward the array of apparatuses 140. The acoustic signal can propagate to the surface 110 and a portion of the signal can be refracted or reflected, and can reach the array of the apparatuses 140. The second vessel 145 may make multiple passes, for example at least four passes, per a single receiver line (e.g., row R1). By acquiring the acoustic signals, the data produced by the apparatuses 140 can be used to determine whether the surface 110 beneath contains lithological formations or fluid layers correlated with the presence of hydrocarbons, minerals, or other elements FIG. 2, among others, depicts an isometric view of the apparatus 140 to acquire seismic data (also referred herein as a seismic sensor device, a seismic data acquisition unit, or a node). The apparatus 140 can have at least one housing 200. The housing 200 can contain, hold, or otherwise include one or more components of the apparatus 140. The housing 200 can define one or more cavities therein to hold or secure the components of the apparatus 140. When the apparatus 140 is placed on the surface 110, the housing 200 can separate at least some of the contained components from the water 105. The housing 200 can prevent the water 105 from entering to contact at least some of the components contained within the housing 200. The housing 200 can have any shape, such as a cylinder (e.g., as depicted), a prism with a polygonal base, a pyramid, or a sphere, among others.

The housing 200 of the apparatus 140 can have at least one longitudinal side 205 (also referred herein as a side). The longitudinal side 205 can correspond to or include a portion of the housing 200 along a longitudinal or vertical axis of the apparatus 140 (e.g., as depicted). The housing 200 can have at least one lateral side 210 (also referred herein as a top side). The lateral side 210 can correspond to or include a portion of the housing 200 along a lateral or a horizontal axis of the apparatus 140 (e.g., as depicted). The housing 200 can have at least one second lateral surface 215 (also referred herein as a bottom side). The second lateral surface 215 can correspond to or include a portion of the apparatus 140 along the lateral or horizontal axis of the apparatus 140 that is opposite of the lateral side 210. The first lateral surface 210 or second lateral surface 215 can be perpendicular or substantially perpendicular (e.g., 60° to 120°) to the longitudinal surface 205. The height of the housing 200 defined by the longitudinal side 205 can range from 5" to 20". The width (or diameter for cylindrical shapes) of the housing 200 defined by at least one of the lateral surfaces 210 or 215 can range between 10" to 30".

The apparatus 140 can include at least one first securing mechanism 220 (also referred herein as outer cleats). The apparatus 140 can include at least one second securing mechanism 225 (also referred herein as inner cleats). The first securing mechanism 220 and the second securing mechanism 225 can fix or hold the housing 200 of the apparatus 140 along the surface 110 when the apparatus 140 is placed underwater. The first securing mechanism 220 and the second securing mechanism 225 can be situated or arranged on the first lateral surface 210 or the second lateral surface 215 (e.g., as depicted). The first securing mechanism 220 can be positioned adjacent or proximate (e.g., within 2" to 5") to the second securing mechanism 225 along the lateral surface 210 or the 215. The first securing mechanism 220 can form a first perimeter and the second securing mechanism 225 can form a second perimeter. The first perimeter for the first securing mechanism 220 can be along an outer edge of the lateral surface 210 or 215. The second perimeter for the second securing mechanism 225 can be separated from the edge of the lateral surface 210 or 215.

The apparatus 140 can include at least one connector 230. The connector 230 can be situated or disposed along the longitudinal side 205 (e.g., as depicted) or one of the lateral sides 210 or 215. The connector 230 can allow at least one external device to be electrically coupled with the components within the apparatus 140 for wired communications. The apparatus 140 can include at least one coupling mechanism 235. The coupling mechanism 235 can be situated or disposed along the longitudinal side 205 (e.g., as depicted) or one of the lateral sides 210 or 215. The coupling mechanism 235 can facilitate coupling the apparatus 140 or facilitate deployment or storage of the apparatus 140. For example, the coupling mechanism 235 can include a ring through which a cable can be inserted in order to facilitate deploying the apparatus 140 in the environment 100. The apparatus 140 can include at least one transceiver 240. The transceiver 240 can be situated or disposed along the longitudinal side 205 (e.g., as depicted) or one of the lateral sides 210 or 215. The transceiver 240 can transmit and receive radiofrequency (RF) signals to allow wireless communications with at least one external device. The communications via the transceiver 240 can facilitate location detection, positioning, or the transmission of information related to seismic operations, such as seismic data, status information, or quality assessment, among others. The apparatus 140 can include an RFID tag. The RFID tag can be used to identify the apparatus 140. The RFID tag can be used to identify the apparatus 140 outside of water. The RFID can contain static identification information. The identification information can be used to identify which apparatus 140 is deployed. The identification information can be used to identify when a particular apparatus 140 is deployed.

The apparatus 140 can include or define at least one hydrophone opening 245 (also referred herein as a slot or aperture). The hydrophone opening 245 can be situated, arranged, or positioned along the longitudinal side 205 (e.g., as depicted) or one of the lateral sides 210 or 215. The hydrophone opening 245 can allow at least one of the components contained in the housing 200 to be in contact to the water 105 to receive acoustic signals traveling through the water 105. The hydrophone opening 245 can allow at least one of the components of the housing 200 to be mechanically coupled (e.g., via a metallic membrane or a ceramic cap) with the water 105 to receive the acoustic signals traveling through the water 105. The hydrophone opening 245 in conjunction with the components within the housing 200 can facilitate location detection, positioning, or the transmission of information related to seismic operations, such as seismic data, status information, or quality assessment, among others. The apparatus 140 can include a zinc anode 250. The zinc anode 250 can protect the apparatus 140 from electrolysis-caused corrosion. The zinc anode 250 can be referred to as a sacrificial anode. The apparatus 140 can include a pressure relief port 255.

FIG. 3, among others, depicts a circuit diagram of a sensor 300 (e.g., as depicted generally along the left). The sensor 300 can be housed, disposed, or arranged within the housing 200 of the apparatus 140. At least a portion of the sensor 300 can be in contact or mechanically coupled (e.g., via a membrane or a cap) with the water 105 via the hydrophone opening 245 of the apparatus 140. The sensor 300 can be a piezoelectric sensor, and can include at least one piezoelectric component 305. The piezoelectric component 305 can be comprised of a material exhibiting piezoelectricity converting mechanical stress to electrical charge. The material for the piezoelectric component 305 can include, for example: a naturally occurring crystal (e.g., quartz, topaz, tourmaline, berlinite, and Rochelle salt), a synthetic crystal (e.g., langasite ($La_3Ga_5SiO_{14}$), lithium niobate ($LiNbO_3$), lithium tantalite ($LiTaO_3$), and gallium orthophosphate (GaPO$_4$)), a ceramic material (e.g., barium titanate (BaTiO$_3$), lead zirconate titante (PZT), lead titantate (PbTiO$_3$), potassium niboate (KNbO$_3$), and sodium tungstate (Na$_2$WO$_3$)), a lead-free piezoceramic (e.g., sodium potassium niobate (NaKNbO$_3$), bismuth ferrite (BiFeO$_3$), barium titante (BaTiO$_3$), bismuth titanate (Bi$_4$Ti$_3$O$_{12}$), and sodium niobate (NaBi(TiO$_3$)$_2$)), a polymer (e.g., polyvinylidene fluoride (PVDF)), and a semiconductor (e.g., zinc oxide (ZnO) with Wurtzite structure), among others.

The sensor 300 can have a first terminal 310 and a second terminal 315 (also referred herein as polarity terminals). Each terminal 310 and 315 of the sensor 300 can correspond to the respective terminals of the piezoelectric component 305. The terminals 310 and 315 can have an opposite polarity from one another. For example, when the first terminal 310 has a positive polarity, the second terminal 315 can have a negative polarity. The sensor 300 can generate emit alternating current (AC), and the polarities of the terminals 310 and 315 can likewise alternate with the alternating current. The positive terminal can correspond to an end of the sensor 300 from which conventional current may flow. The negative terminal can correspond to the opposite end of the sensor 300 into which conventional current may flow.

Via the piezoelectric component 305, the sensor 300 can convert at least one incoming acoustic signal 320 to at least one electric signal 325. The acoustic signal 320 can transverse or travel through a liquid or aqueous medium (e.g., the body of water 105 in the environment 100), when received at the piezoelectric component 305. The acoustic signal 320 can be emitted by the acoustic source device 150 and can be reflected or refracted by lithological features beneath the surface 110 in the environment 100. Upon refraction or reflection, the acoustic signal 320 can reach the apparatus 140. At least a portion of the piezoelectric component 305 can be positioned or arranged within the hydrophone opening 245 of the apparatus 140. The portion of the piezoelectric component 305 be in contact or mechanically coupled with the water 105 to receive the acoustic signal 320 (e.g., through the hydrophone opening 245). The piezoelectric component 305 (or the mechanical coupling between the piezoelectric component 305 and the water 105) can have an acoustic impedance matching the acoustic impedance of the liquid medium (e.g., the water 105). With the matching of impedances, contact with the acoustic signal 320 traveling through the liquid medium can induce or cause mechanical stress upon the piezoelectric component 305. The mechanical stress can induce the piezoelectric component 305 to generate the electric signal 325 to pass to electrical components coupled with the sensor 300.

The operating characteristics of the sensor 300 can be characterized or approximated using a model circuit 350 (e.g., depicted generally along the right) (also referred herein as an equivalent circuit). The example of the model circuit 350 depicted may be a Norton equivalent circuit, but other equivalent circuits (e.g., a Thévenin equivalent circuit) may be used to characterize or approximate the operating characteristics of the sensor 300. The model circuit 350 can include at least one alternating current (AC) voltage source 355 and one or more impedance components such as at least one capacitor 360 and at least one resistor 365. The model circuit 350 can also include at least one inductor. The AC voltage source 355, the capacitor 360, and the resistor 365 can be coupled with one another in parallel or in series, or in any combination. For example, as depicted, the AC voltage source 355 can be coupled in series with the capacitor 360. The AC voltage source 355 and the capacitor 360 together can be coupled in parallel with the resistor 365.

Within the model circuit 350, the AC voltage source 355 can correspond to or represent generation voltage upon induction of the mechanical stress on the piezoelectric component 305. The AC voltage source 355 can have a sensitivity of 84 μV/Pa (8.4 V/bar). The AC voltage source 355 can have a sensitivity of and 89 μV/Pa (8.9 V/bar). The apparatus 140 can digitize an input signal in a range of +/−2.5 V. Therefore, the maximum sound pressure level input can range between 28.1 kPa (281 mbar) and 29.8 kPa (298 mbar). The hydrophones can generate voltages greater than the maximum value that the channel input can accurately digitize if pressures greater than these are applied. The capacitor 360 can correspond to or represent an inherent capacitance of the piezoelectric component 305, such as a static capacitance and a capacitance arising from the mechanical stress (e.g., change in water pressure) from the acoustic signal 320. The capacitance of the capacitor 360 for a properly functioning piezoelectric component 305 can range between 10 nF (+/−15%). The resistor 365 can correspond to or represent leakage resistance of the piezoelectric component 305 faced by the electric signal 325 generated from the inducement of the mechanical stress. The resistance of the resistor 365 for a properly functioning piezoelectric component 305 can be about 270 MΩ (+/−15%). The resistance of the resistor 365 for a properly functioning piezoelectric component 305 can be greater than 270 MΩ.

Figure 4:
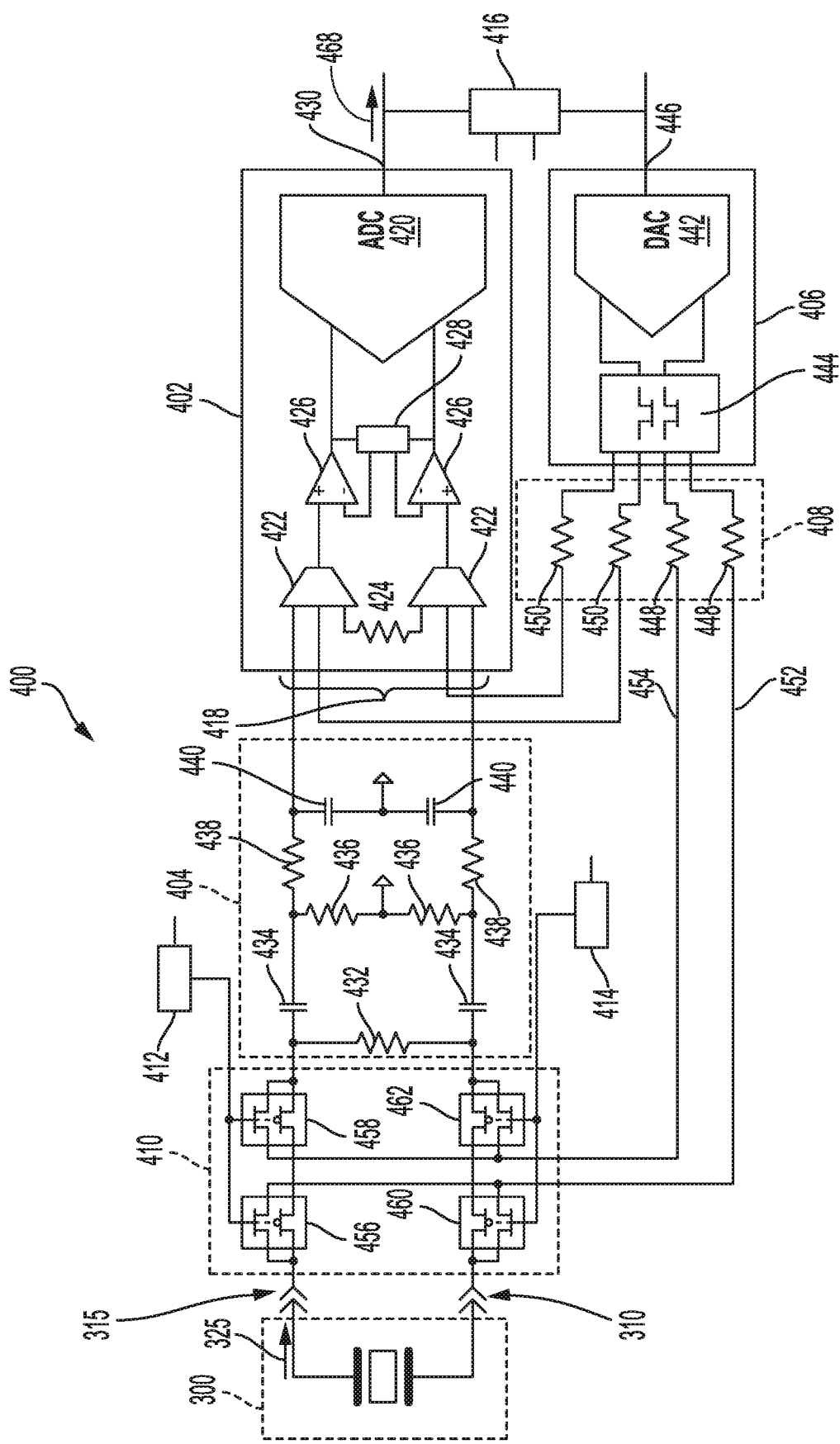
FIG. 4 depicts a circuit diagram of an example system to measure hydrophone impedance.

FIG. 4, among others, depicts a circuit diagram of an electronic circuit or a system 400 to measure hydrophone impedance. The system 400 can include one or more electrical components coupled with one another. The components of the system 400 can be housed, contained, or otherwise included within the apparatus 140, such as within the housing 200. The components of the system 400 can be arranged on or implemented using one or more printed circuit boards (PCBs), stamped circuit boards (SCBs), application-specific integrated circuits (ASICs), field-programmable gate arrays (FPGAs), multi-chip modules, breadboards, wire wrap boards, and stripboards, among others, or any combination thereof. The system 400 can include the sensor 300, among other components. The sensor 300 can be coupled with one or more of the components in the system 400. The sensor 300 can convert the incoming acoustic signal 320 to the electric signal 325. Coupled with other components of the system 400, the sensor 300 can pass the electric signal 325 generated in response to the inducement of the mechanical stress from the acoustic signal 320 to the other components.

The system 400 can include at least one signal encoder 402 (sometimes referred herein as a delta-sigma modulator). The signal encoder 402 can be coupled with one or more components of the system 400. The signal encoder 402 can be coupled in parallel with the sensor 300, for example, via other components of the system 400. The signal encoder 402 can have at least one input channel 418. The input channel 418 can correspond to or can define coupling of the signal encoder 402 with the remainder of the system 400, including the sensor 300. The input channel 418 can define a first terminal and a second terminal, with polarities opposite of one another. Each terminal of the input channel 418 can have one or more connections with other components of the system 400. The first terminal of the input channel 418 can correspond to and be coupled with the first terminal 310 of the sensor 300 of the same polarity. Conversely, the second terminal of the input channel 418 can correspond to and be coupled with the second terminal 315 of the sensor 300 of the same polarity. Coupled in parallel with the sensor 300 via the input channel 418 and other components of the system 400, the signal encoder 402 can receive the electric signal 325 from the sensor 300. The electric signal 325 can pass through other components of the system 400 and be relayed to the signal encoder 402.

The signal encoder 402 can include at least one analog-to-digital converter (ADC) unit 420. The ADC unit 420 can include circuitry to convert electric signals in the analog domain to electric signals in the digital domain. Signals in the digital domain in the system 400 can represent a sequence of discrete values. For example, signals in the digital domain can represent binary values and can include a series of pulses generated using pulse amplitude modulation, with high voltage representing "1" and low voltage representing "0" in binary. With the receipt, the ADC unit 420 can convert the electric signal 325 from the analog domain to the digital domain. The electric signal 325 can be initially in the analog domain. To convert, the ADC unit 420 can sample the electric signal 325 from the sensor 300. The sampling rate of the ADC unit 420 can range between 250 Hz to 2 kHz for a 4 ms to 0.5 ms sampling interval. For example, the sampling rate for the ADC unit 420 can be 500 Hz for a 2 ms sampling interval. Upon sampling, the ADC unit 420 can perform quantization on the sampled electric signal 325 to generate a signal 468 (also sometimes referred herein as a resultant signal) in the digital domain. The signal 468 generated by the ADC unit 420 may be a digital domain representation of the electric signal 325 from the sensor 300 of the analog domain. The signal encoder 402 can send, convey, or output the signal 468 for additional processing via at least one output channel 430.

Between the input channel 418 and the ADC unit 420, the signal encoder 402 can include one or more components to modulate the received electric signal 325, such as a set of multiplexers 422, at least one impedance component 424, a set of amplifiers 426, and at least one gain controller 428. The set of multiplexers 422 (sometimes referred herein as a mux) can be coupled with the one or more other components of the system 400 via the input channel 418. Each multiplexer 422 can coupling of the signal encoder 402 with the other components of the system 400. Each multiplexer 422 can be set (e.g., using a control signal) to permit or pass the electric signal 325 from the sensor 300 to the ADC unit 420. Each multiplexer 422 can be set (e.g., using a control signal) to restrict or block the electric signal 325 from the sensor 300 to pass to the ADC unit 420, and allow a signal from another component to pass through. The impedance component 424 can include a resistor (e.g., as depicted with a resistance value of 800Ω), a capacitor, or an inductor, among others, and can be coupled between the set of multiplexers 422 to provide a reference impedance for the electric signal 325. The set of amplifiers 426 can include an operational amplifier (e.g., as depicted), a transistor amplifier, or a differential amplifier (e.g., an instrumentation amplifier), among others. Each amplifier 426 can amplify the electric signal 325 passing through the other components from the sensor 300, prior to input to the ADC unit 420. The gain controller 428 be coupled with each of the amplifiers 425, and can regulate, adjust, or set an amount or factor of amplification to be applied by the amplifier 426 to the electric signal 325. The amplification factor can range between 1 and 64. For example, the amplification factor can be 1, 2, 4, 8, 16, 32, or 64.

The system 400 can include at least one input filter network 404 (sometimes generally referred herein as a filter circuit or a filter). The input filter network 404 can be coupled with other components of the system 400. The input filter network 404 can be coupled in parallel between the sensor 300 and the input channel 418 of the signal encoder 402 (e.g., as depicted). Toward the sensor 300, the input filter network 404 can have a set of terminals connected with the sensor 300 to couple the input filter network 404 with the input filter network 404. The set of terminals can have polarities opposite to one another. A first terminal of the input filter network 404 can correspond to and be coupled with the first terminal 310 of the sensor 300 of the same polarity. A second terminal of the input filter network 404 can correspond to and be coupled with the second terminal 315 of the sensor 300 of the same polarity. Conversely, toward the signal encoder 402, the input filter network 404 can have a set of terminals connected with the input channel 418 of the signal encoder 402. The set of terminals can have polarities opposite to one another. A first terminal of the input filter network 404 can correspond to and be coupled with the first terminal of the input channel 418 of the same polarity. A second terminal of the input filter network 404 can correspond to and be coupled with the second terminal of the input channel 418 of the same polarity. The input filter network 404, along with the sensor 300 and at least the input channel 418 of the signal encoder 402 can be part of a hydrophone channel in the system 400.

Coupled in parallel with the sensor 300 and the signal encoder 402, the input filter network 404 can pass or convey the electric signal 325 received from the sensor 300 to the signal encoder 402. As the electric signal 325 passes from the sensor 300 through the input filter network 404 to the signal encoder 402, the input filter network 404 can apply a filtering operation to the electric signal 325. The filter operation may be in the analog domain (e.g., as depicted) or in the digital domain. In applying the filtering operation, the input filter network 404 can amplify, attenuate, or maintain the electric signal 325 at certain frequency components. The filtering operation can include, for example, a low-pass filter, a high-pass filter, a band-pass filter, a pass-band filter, or an all-pass filter, among others, or any combination thereof. The filtering operation can be in accordance with any number of filtering families, such as a Bessel filter, Butterworth filter, a Chebyshev filter, an elliptic filter, a Gaussian filter, or a raised-cosine filter, among others.

To attain the filtering operation with the desired operating characteristics, the input filter network 404 can have a set of impedance components coupled with one another in series, in parallel, or in combination of both series and parallel. For example, as depicted, the set of impedance components in the input filter network 404 can include a resistor 432 connected in parallel with the sensor 300 with a resistance of 10 MΩ (+/−15%). The input filter network 404 can also include set of capacitors 434 coupled in series with the sensor 300 and the resistor 432, each with a capacitance of 33 nF (+/−15%). The input filter network 404 can include a set of resistors 436 connected in parallel with the sensor 300, each with a resistance of 6.81 MΩ (+/−15%). The input filter network 404 can include a set of resistors 438 connected in series with the sensor 300, each with a resistance of 10 kΩ (+/−15%). The input filter network 404 can include a set of capacitors 440 coupled in parallel with the sensor 300, each with a capacitance of 10 pF (+/−15%). With the impedance components coupled in this manner, the input filter network 404 can function as a band-pass filter with a lower cut-off frequency of 3.15 Hz and a higher cut-off frequency of 1.6 MHz.

The system 400 can include at least one test signal generator 406. The coupling of the input signal generator 406 with the sensor 300 and the signal encoder 402 can be controlled via one or more other components of the system 400. The test signal generator 406 can be coupled in series with the sensor 300 and the signal encoder 402. As depicted, for example, the test signal generator 406 can be coupled in series between the sensor 300 and the input filter network 404. Coupled in this manner, an electrical connection may be formed from the sensor 300 through the test signal generator 406 then to the input filter network 404 and then to the signal encoder 402. The test signal generator 406 can be also be uncoupled in series with the sensor 300 and the signal encoder 402 to permit the electric signal 325 to pass from the sensor 300 to the signal encoder 402 without traversing the test signal generator 406.

The test signal generator 406 can have sets of terminals coupled with the sensor 300 and with the signal encoder 402 via the input filter network 404. Toward the signal encoder 402, the test signal generator 406 can have a set of terminals connected with the input channel 418 of the signal encoder 402 via the input filter network 404. The set of terminals can have polarities opposite to one another. A first terminal of the test signal generator 406 can correspond to and be coupled with the first terminal of the input channel 418 of the opposite polarity. A second terminal of the test signal generator 406 can correspond to and be coupled with the second terminal of the input channel 418 of the opposite polarity. Toward the sensor 300, the test signal generator 406 can have a set of terminals 452 and 454 connected with the sensor 300 to couple the test signal generator 406 with the test signal generator 406. The set of terminals 452 and 454 can have polarities opposite to one another. The coupling of the terminals 452 and 454 of the test signal generator 406 with the terminals 310 and 315 of the sensor 300 can be modified, set, or controlled.

The test signal generator 406 can generate one or more test signals to send and pass through the one or more various components of the system 400. The test signal sent through the system 400 can be in the analog domain. The test signal can have one or more characteristics defined or set by another component in the system 400. The characteristics of the test signal can include, for example, an amplitude, a period, a frequency, a duration, and a signal waveform, among others. When coupled with the sensor 300 and the signal encoder 402, the test signal generator 406 can send the test signal through the sensor 300, the input filter network 404, and the signal encoder 402. When uncoupled from the sensor 300 and the signal encoder 402, the test signal generator 406 can restrict or omit transmission of the test signal through the sensor 300, the input filter network 404, and the signal encoder 402.

To generate and send the test signal, the test signal generator 406 can include at least one digital-to-analog converter (DAC) unit 442. The DAC unit 442 can include circuitry to convert electric signals from the digital domain to the analog domain. The signal in the digital domain can be received via at least one input channel 446 of the test signal generator 406 from one or more other components in the system 400. The signal in the digital domain can include a time-series data of values (e.g., binary number, floating value, or an integer) representing a to-be-formed signal in the analog domain. To convert, the DAC unit 442 can include generate a sequence of impulses using the received signal of the digital domain (e.g., by applying a zero-order hold). In generating the impulses, the DAC unit 442 can up-sample by a sampling rate of 0.4883 Hz to 250 Hz. The output level can be controlled by both analog gain (in 6-dB steps), and digital gain (in 0.5-dB steps). The DAC unit 442 can apply or perform an interpolation operation (e.g., using a reconstruction filter) to output the electric signal of the analog domain as the test signal. Upon application of the interpolation operation, the DAC unit 442 send the test signal to the other components of the system 400, such as the sensor 300, the input filter network 404, and the signal encoder 402.

Between the DAC unit 442 and the other components of the system 400, the test signal generator 406 can include at least a set of output regulators 444 to control output of the electric signal from the DAC unit 442 to the rest of the system 400. Each output regulator 444 can include a component capable of amplifying and switching, such as a field-effect transistor (FET) (e.g., a metal-oxide-semiconductor field-effect transistor (MOSFET) or a junction field-effect transistor (JFET)) or a bipolar junction transistor (BJT), among others. The output regulator 444 can be coupled in series between the output of the test signal generator 406 and the DAC unit 442. Coupled with the DAC unit 442, the output regulator 444 can amplify the test signal to be sent to the other components of the system 400. In addition, the output regulator 444 can control whether transmission of the test signal to the remainder of the system 400 by restricting or permitting passing of the test signal from the DAC unit 442 through the output regulators 444.

The system 400 can include an impedance bank 408 (also referred herein as a set of impedance components). The impedance bank 408 can include a set of impedance components 448 coupled in series with the sensor 300 and with the test signal generator 406. The set of impedance components 448 can include resistors (e.g., as depicted), capacitors, and inductors, among others. For example, as depicted, the set of impedance components 448 can include resistors, and can have a resistance of 422Ω (+/−10%). Coupled in series between the sensor 300 and the test signal generator 406, the set of impedance components 448 can control or regulate the voltage of the test signal generated and sent by the test signal generator 406. The impedance bank 408 can include also a set of impedance components 450 coupled in series with the signal encoder 402 and the test signal generator 406. The set of impedance component 450 can include resistors (e.g., as depicted), capacitors, and inductors, among others. For example, as depicted, the set of impedance components 450 can include resistors, and can have a resistance of 422 Ω (+/−10%). Coupled in series between the test signal generator 406 and the signal encoder 402, the set of impedance components 450 can control or regulate the voltage of the signal between the test signal generator 406 and the signal encoder 402.

The system 400 can include at least one switch component 410 (sometimes referred herein as a switch network). The switch component 410 can be coupled with the sensor 300, the signal encoder 402 (via the input filter network 404), and the test signal generator 406 (via the impedance bank 408). The switch component 410 can set, modify, or otherwise control the coupling of the test signal generator 406 with the sensor 300 and the signal encoder 402. The setting of the coupling by the switch component 410 can be commanded from one or more signals from other components in the system 400. In controlling the coupling, the switch component 410 can couple the test signal generator 406 in series between the sensor 300 and the signal encoder 402 (e.g., via the input filter network 404). The switch component 410 can control the coupling of the terminals 452 and 454 of the test signal generator 406 with the terminals 310 and 315 of the sensor 300. When coupled in series, an electric signal flowing through the system 400 can traverse from the test signal generator 406, then the sensor 300, then to the input filter network 404, and then to the signal encoder 402. The direction of the electric signal flowing through the system 400 can depend on the coupling of the terminals 452 and 454 of the test signal generator 406 with the terminals 310 and 315 of the sensor 300. Conversely, the switch component 410 can uncouple the test signal generator 406 from the sensor 300, the signal encoder 402, and the input filter network 404. When uncoupled, an electric signal (e.g., the electric signal 325) flowing through the system 400 can traverse from the sensor 300, then to the input filter network 404, and then to the signal encoder 402, without going through the test signal generator 406.

To set the coupling among the components of the system 400, the switch component 410 can include a set of switches, such as four switches 456-462 as depicted. Each switch 456-462 can include at least one component capable of switching or regulating current flow, such as a field-effect transistor (FET) (e.g., a metal-oxide-semiconductor field-effect transistor (MOSFET) or a junction field-effect transistor (JFET)), a bipolar junction transistor (BJT), or a mechanically operable toggle, among others. For example, as depicted, each switch 456-462 can be a pair of field-effect transistors, each with a source terminal, a drain terminal, and a gate terminal. By configuring the set of switches 456-462, the switch component 410 can set or control the coupling and uncoupling of the test signal generator 406 with the sensor 300, the input filter network 404, and the signal encoder 402. In every switch 456-462, the gate terminal of each field-effect transistor can be coupled with another component of the system 400 to receive command signals to couple or uncouple the test signal generator 406 from the sensor 300 and the signal encoder 402 via the input filter network 404.

The set of switches 456-462 can be coupled with one of the first terminal 310 and the second terminal 315 of the sensor 300. Switches 456 and 458 (collectively referred herein sometimes as positive terminal switches) can be coupled with the second terminal 315 of the sensor 300, the signal encoder 402 via the input filter network 404, and the test signal generator 406. Continuing with the example as depicted, in the switch 456, the source terminal of both of the field-effect transistors in the pair can be coupled with the second terminal 315 of the sensor 300. In the switch 456, the drain terminal of one of the field-effect transistors (e.g., the bottom one in the depiction) can be coupled with the signal encoder 402 via the input filter network 404 and the switch 458. The drain terminal of the other field-effect transistors (e.g., the top one in the depiction) in the pair of the switch 456 can be coupled with the test signal generator 406 via the impedance bank 408. In addition, in the switch 458, the drain terminal of both of the field-effect transistors in the pair can be coupled with one of the terminals of the input channel 418 of the signal encoder 402 via the input filter network 404. In the switch 456, the source terminal of one of the field-effect transistors (e.g., the bottom one in the depiction) can be coupled with the second terminal 315 of the sensor 300 via the switch 456. The source terminal of the other field-effect transistor (e.g., the top one in the depiction) in the pair of the switch 458 can be coupled with the test signal generator 406 via the impedance bank 408.

Conversely, switches 460 and 462 (collectively referred herein sometimes as negative terminal switches) can coupled with the first terminal 310 of the sensor 300, the signal encoder 402 via the input filter network 404, and the test signal generator 406. In the example as depicted, in the switch 460, the source terminal of both of the field-effect transistors in the pair can be coupled with the first terminal 310 of the sensor 300. In the switch 460, the drain terminal of one of the field-effect transistors (e.g., the top one in the depiction) can be coupled with the signal encoder 402 via the input filter network 404 and the switch 462. The drain terminal of the other field-effect transistors in the pair of the switch 460 (e.g., the bottom one in the depiction) can be coupled with the test signal generator 406 via the impedance bank 408. In addition, in the switch 462, the drain terminal of both of the field-effect transistors in the pair can be coupled with one of the terminals of the input channel 418 of the signal encoder 402 via the input filter network 404. In the switch 462, the source terminal of one of the field-effect transistors (e.g., the top one in the depiction) can be coupled with the first terminal 310 of the sensor 300 via the switch 460. The source terminal of the other field-effect transistor (e.g., the bottom on in the depiction) in the pair of the switch 462 can be coupled with the test signal generator 406 via the impedance bank 408.

The system 400 can include at least one first switch control 412 (sometimes referred herein as the positive polarity terminal switch control). The first switch control 412 can control the connection of the test signal generator 406 with the sensor 300 and the signal encoder 402 via the switch control 410. To control the connection of the test signal generator 406, the first switch control 412 can be coupled with each of the switches 456 and 458 that can be coupled with the second terminal 315 of the sensor 300. For example, as depicted, the first switch control 412 can be coupled with each of the gate terminals of all the field-effect transistors in switches 456 and 458 to control flow through the source and drain terminals. Coupled with the switches 456 and 458, the first switch control 412 can apply, convey, or otherwise send an activation signal to each switch 456 and 458 to control coupling or uncoupling of the test signal generator 406 with the sensor 300 and the signal encoder 402 via the input filter network 404. The activation signal can be provided or directed by another component in the system 400 coupled with the first switch control 412.

The system 400 can include at least one second switch control 414 (sometimes referred herein as the negative polarity terminal switch control). The second switch control 414 can control the connection of the test signal generator 406 with the sensor 300 and the signal encoder 402 via the switch control 410. To control the connection of the test signal generator 406, the second switch control 414 can be coupled with each of the switches 460 and 462. For example, as depicted, the second switch control 414 can be coupled with each of the gate terminals of all the field-effect transistors in switches 460 and 462 to control flow through the source and drain terminals. Coupled with the switch 460 and 462, the second switch control 414 can apply, convey, or otherwise send an activation signal to each switch 460 and 462 to control coupling or uncoupling of the test signal generator 406 with the sensor 300 and the signal encoder 402 via the input filter network 404. The activation signal can be provided or directed by another component in the system 400 coupled with the second switch control 414.

The system 400 can include at least one instrumentation component 416 (also referred herein as an impedance measurer). The instrumentation component 416 can measure, calculate, or determine one or more operational characteristics of at least the sensor 300, among other components, in the system 400. For example, the instrumentation component 416 can determine operational characteristics of the hydrophone channel including the sensor 300, the input filter network 404, and the input channel 418 to the signal encoder 402. The operational characteristics can include an impedance, such as the resistance (e.g., as modeled by resistor 365), the capacitance (e.g., as modeled by the capacitor 360), and the inductance of the sensor 300, among others. The impedance can be measured by the instrumentation component 416 relative to a test signal applied to the sensor 300 and other components of the system 400. The operational characteristics determined by the instrumentation component 416 can include a frequency response (e.g., in the form of a transfer function) of the sensor 300 (or the hydrophone channel) to the test signal applied through the sensor 300.

Figure 14:
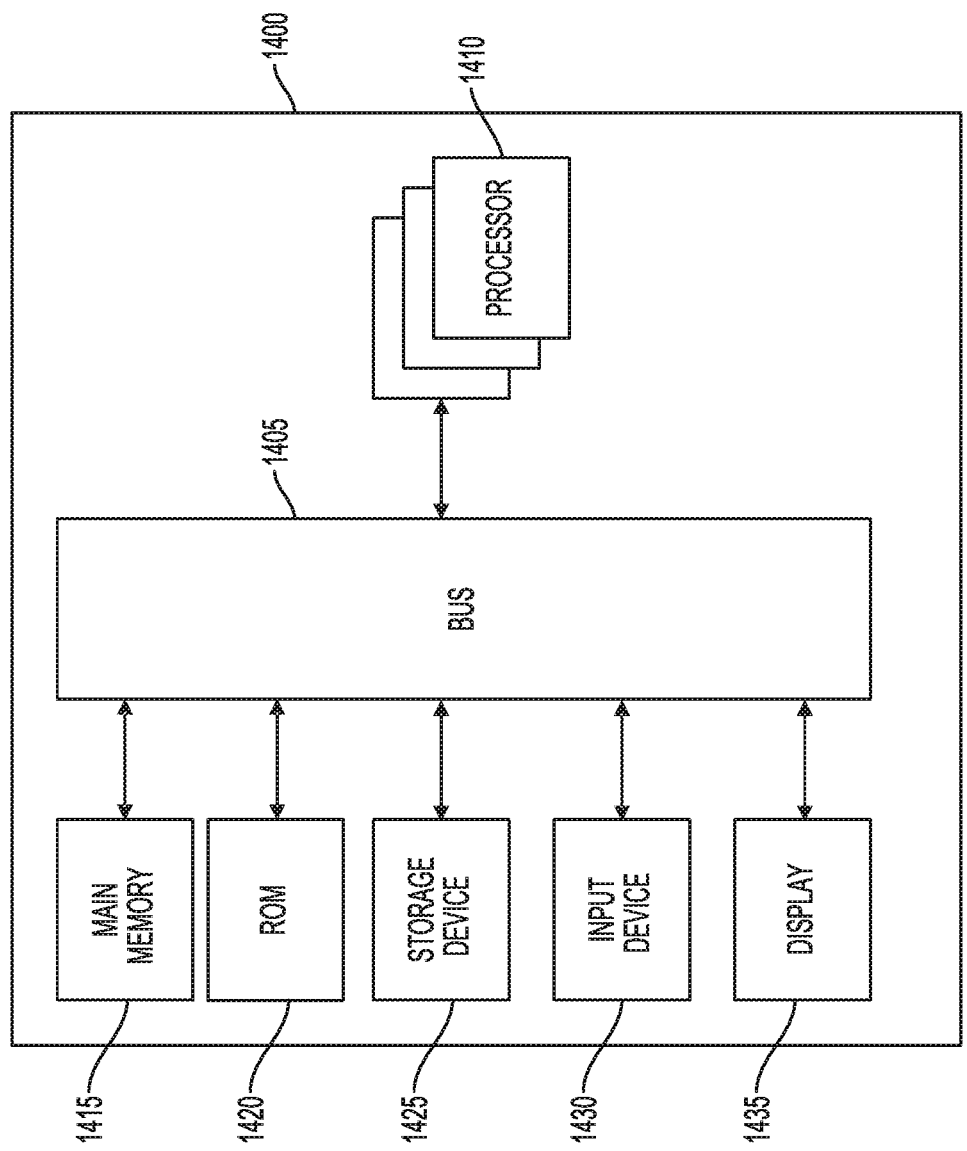
FIG. 14 depicts a block diagram of an architecture for a computing system to implement various elements of the systems and methods described herein.

The instrumentation component 416 can include one or more components (e.g., processors and memory as depicted in FIG. 14) that can be coupled with one or more other components in the system 400. The instrumentation component 416 can be coupled with the output channel 430 of the signal encoder 402 to receive the signal 468. The instrumentation component 416 can be coupled with the input channel 446 of the test signal generator 406. The instrumentation component 416 can be coupled with the first switch control 412 to control the switch component 410 in coupling or uncoupling the test signal generator 406 from the sensor 300 and the signal encoder 402 via the input filter network 404. The instrumentation component 416 can be coupled with the second switch control 414 to control the switch component 410 in coupling or uncoupling the test signal generator 406 from the sensor 300 and the signal encoder 402 via the input filter network 404. The instrumentation component 416 can be separate from the switch controls 412 and 414 and the test signal generator 406 (e.g., as depicted). The instrumentation component 416 can include the switch controls 412 and 414 and the test signal generator 406. The instrumentation component 416 can receive and feed signals to the coupled components (e.g., the signal encoder 402, the test signal generator 406, and the switch controls 412 and 414) in the digital domain.

The instrumentation component 416 can set or control an operational state for the system 400. The operational state can define or specify the flow of electric signals through the system 400 from the sensor 300 to the signal encoder 402. The operational states can include a normal operational state and one or more testing operational states. The normal or default operational state can specify that the test signal generator 406 is to be disconnected from the sensor 300, the input filter network 404, and the signal encoder 402. Conversely, the testing operational states can specify that the test signal generator 406 is to be coupled in series in between the sensor 300 and the signal encoder 402 via the input filter network 404 and to provide test signal for measuring the operational characteristics of the sensor 300. During the testing operational states, the instrumentation component 416 can the operational characteristics of the sensor 300 (or the hydrophone channel).

To set the operational state for the system 400, the instrumentation component 416 can generate and provide one or more activation signals (sometimes referred herein as command signals) to the components of the system 400. The setting of the operational state can be provided by user input (e.g., an administrator or operator of the apparatus 140) via an input/output (I/O) interface coupled with the apparatus 140 or the instrumentation component 416 of the system 400. The instrumentation component 416 can determine or identify the operational state set for the system 400. In accordance with the identified operational state, the instrumentation component 416 can identify the activation signals to apply to the components of the system 400. Upon identification, the instrumentation component 416 can generate and send the one or more activation signals to the components of the system 400, such as the switch controls 412 and 414 and the test signal generator 406.

Under the normal operational state, the instrumentation component 416 can provide or apply the one or more activation signals to the first switch control 412 and the second switch control 414. The application of the activation signals by the instrumentation component 416 can be in response to identifying the operational state as normal. The activation signal applied to the first switch control 412 can specify that the switches 456 and 458 are to permit flow of the electric signal 325 from the sensor 300 through the input filter network 404 to the signal encoder 402. The activation signal applied to the first switch control 412 can specify that the switches 456 and 458 are to uncouple the test signal generator 406 from the sensor 300 and the signal encoder 402 via the input filter network 404. Likewise, the activation signal applied to the second switch control 414 can specify that the switches 460 and 462 are to permit flow of the electric signal 325 from the sensor 300 through the input filter network 404 to the signal encoder 402. The activation signal applied to the second switch control 414 can specify that the switches 460 and 462 are to uncouple the test signal generator 406 from the sensor 300 and the signal encoder 402 via the input filter network 404. In this manner, during the normal operational state, the instrumentation component 416 can permit the system 400 (including the sensor 300, the input filter network 404, and the signal encoder 402) to function. The instrumentation component 416 can inhibit passage or application of any signal from the test signal generator 406 through the sensor 300 and the input filter network 404 to the signal encoder 402. The instrumentation component 416 can also refrain or cease performing determinations of the operational characteristics of the sensor 300.

Figure 5:
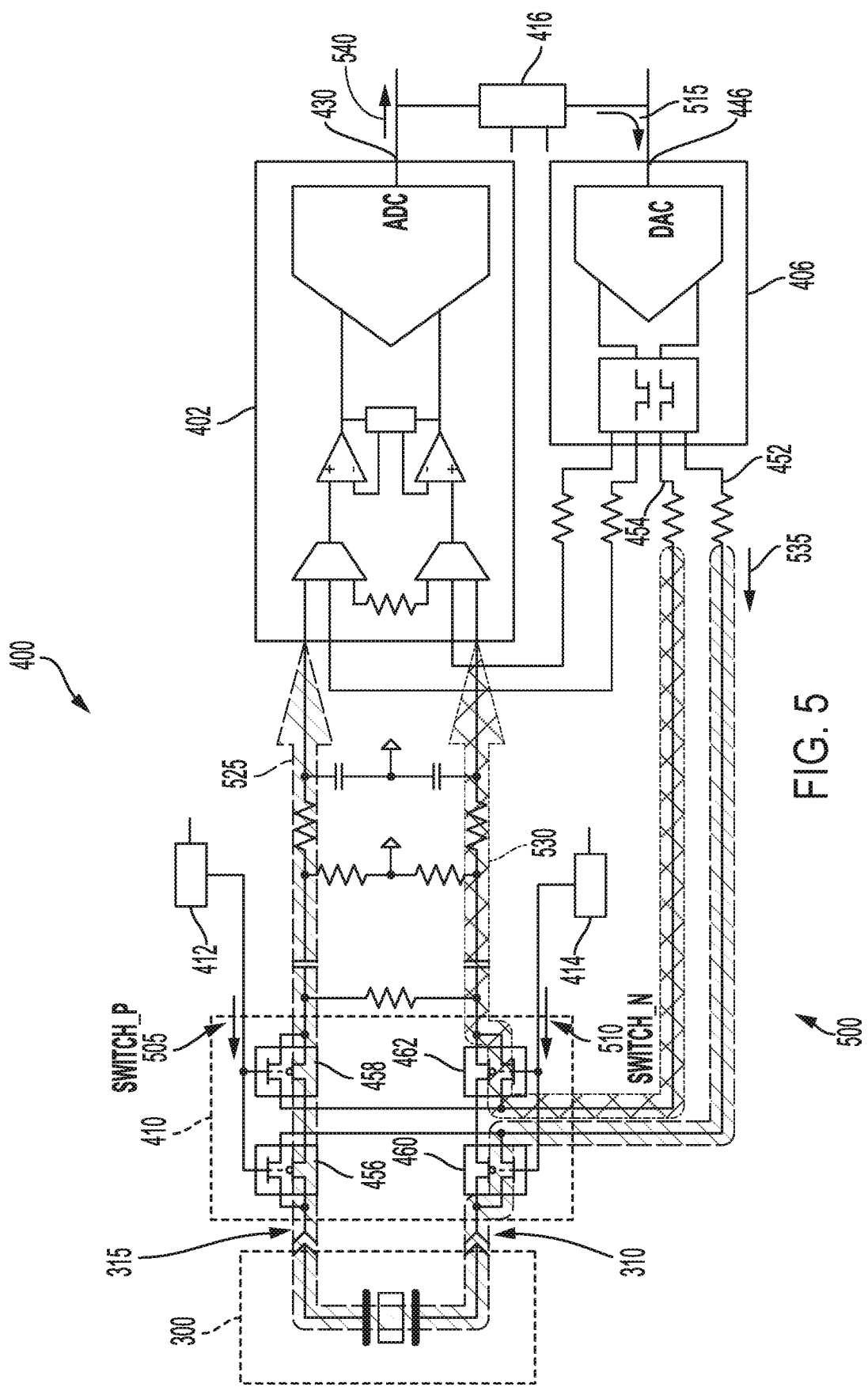
FIG. 5 depicts a circuit diagram of an example system to measure hydrophone impedance in a first operational mode.

FIG. 5, among others, depicts a circuit diagram of the system 400 to measure hydrophone impedance in a first testing operational state 500. The first testing operational state 500 can facilitate the measurement of the operational characteristics of the sensor 300 in one path or direction. The first testing operational state 500 can specify that the first terminal 452 of the test signal generator 406 is to be coupled with the first terminal 310 of the sensor 300. The first testing operational state 500 can also specify that the second terminal 454 of the test signal generator 406 is to be coupled with one of the terminals of the input channel 418 of the signal encoder 402. Upon identifying the operational state of the system 400 as the first testing operational state 500, the instrumentation component 416 can apply one or more activation signals to the switch component 410 via the switch controls 412 and 414 to couple the first terminal 452 of the test signal generator 406 with the first terminal 310 of the sensor 300.

The instrumentation component 416 can generate and apply at least one activation signal 505 (e.g., depicted as "SWITCH_P" signal) to the switches 456 and 458 of the switch component 410 via the first switch control 412. For example, the instrumentation component 416 can relay the activation signal 505 to the first switch control 412 to operate the first switch control 412 in the first testing operational state 500. The first switch control 412 can in turn relay the activation signal 505 to each of the gate terminals of the field-effect transistors in the switches 456 and 458. The activation signal 505 can specify that the switch 456 is to couple the second terminal 315 of the sensor 300 with one of the terminals of the input channel 418 of the signal encoder 402 via the switch 456. The activation signal 505 can also specify that the switch 458 is to couple the second terminal 315 of the sensor 300 with the same terminal of the input channel 418 of the signal encoder 402 via the switch 456.

Concurrently with the application of the activation signal 505 (e.g., within nanoseconds or microseconds), the instrumentation component 416 can generate and apply at least one activation signal 510 (e.g., depicted as "SWITCH_N" signal) to the switches 460 and 462 of the switch component 410 via the second switch control 414. For example, the instrumentation component 416 can relay the activation signal 510 to the second switch control 414 to operate the second switch control 414 in the first testing operational state 050. The second switch control 414 can in turn relay the activation signal 510 to each of the gate terminals of the field-effect transistors in the switches 460 and 462. The activation signal 510 can specify that the switch 460 is to couple the first terminal 452 of the test signal generator 406 with the first terminal 310 of the sensor 300. The activation signal 510 can also specify that the switch 462 is to couple the second terminal 454 of the test signal generator 406 with one of the terminals of the input channel 418 of the signal encoder 402. The terminal of the input channel 418 coupled via the switch 460 can differ from the terminal of the input channel 418 coupled via the switch 458 (e.g., as depicted).

With the application of the activation signals 505 and 510, the switch component 410 can form a first path 525 and a second path 530 between the test signal generator 406 and the signal encoder 402 through the sensor 300, the switch component 410 itself, and the input filter network 404, among others. The first path 525 can define an electrical connection between: the first terminal 452 of the test signal generator 406, through the switch 460 of the switch component 410, the first terminal 310 of the sensor 300, the second terminal 315 of the sensor 300, the switches 456 and 458 of the switch component 410, the input filter network 404, and then to one of the terminals of the input channel 418 at the signal encoder 402. The second path 530 can define an electrical connection between: the second terminal 454 of the test signal generator 406, through the switch 462 of the switch component 410, the input filter network 404, and then to the opposite terminal of the input channel 418 at the signal encoder 402.

In conjunction with the applications of the activation signals 505 and 510, the instrumentation component 416 can generate and provide at least one control signal 515 to the test signal generator 406. The control signal 515 can indicate a state for the test signal generator 406, such an active state (also referred herein to as an on state) or an inactive state (also referred herein to as an off state). Upon identifying the operational state of the system 400 as not the normal operating state, the instrumentation component 416 can generate the control signal 515 to indicate the state of the test signal generator 406 as the active state. Otherwise, upon identifying the operational state of the system 400 as not the normal operating state, the instrumentation component 416 can generate the control signal 515 to indicate the state of the test signal generator 406 as the inactive state. Additionally, the instrumentation component 416 can generate the control signal 515 to include time-series data (or instructions) for generating at least one test signal 535 to measure the operational characteristics of the sensor 300 (or the hydrophone channel). The time-series data of the control signal 515 can be a digital signal. The time-series data can specify or define the characteristics of the test signal 535 to be generated by the test signal generator 406, such as an amplitude, a period, a frequency, a duration, and a signal waveform, among others. With generation, the instrumentation component 416 can provide the control signal 515 to the test signal generator 406.

Upon receipt from the instrumentation component 416, the test signal generator 406 can parse the control signal 515. In parsing the control signal 515, the test signal generator 406 can identify the specified state. When the specified state is identified as inactive, the test signal generator 406 can restrict or cease, or may not generate any test signal 535 to send through the sensor 300. On the other hand, when the specified state is identified as active, the test signal generator 406 can parse and identify the time-series data of the control signal 515. The test signal generator 406 can generate the test signal 535 in accordance with the time-series data of the control signal 515. The test signal 535 can be used to measure the operational characteristics of the sensor 300 (or the hydrophone channel), such as impedance. The test signal generator 406 can generate the test signal 535 to have the characteristics specified by the control signal 515, such as an amplitude, a period, a frequency, a duration, and a signal waveform, among others. The amplitude of the test signal 535 have a maximum of 635 V+/−1.25 V. The frequency of the test signal 535 can range between 2048 to 4 milliseconds. The signal waveform for the test signal 535 can include a saw tooth wave, sine wave, a square wave, a triangle wave, and a linear chirp, and a geometric chirp, among others.

With the generation in accordance with the control signal 515, the test signal generator 406 can send, convey, or provide the test signal 535 via the first path 525 (or the second path 530). Furthermore, with the applications of the activation signals 505 and 510, the switch component 410 can route the test signal 535 from the test signal generator 406, through the first terminal 310 of the sensor 300, then the second terminal 315 of the sensor 300, and then to one of terminals of the input channel 418 of the signal encoder 402 (e.g., through the first path 525 as depicted). Upon arrival of the test signal 535 that has traversed through the first path 525, the signal encoder 402 can convert the test signal 535 from the analog domain to the digital domain and can generate a resultant signal 540. The resultant signal 540 can be generated by the signal encoder 402 using the same functionality to generate the signal 468. The resultant signal 540 can be digital domain representation of the test signal 535 when received by the signal encoder 402, and can include time-series data corresponding to the test signal 535 in the digital domain. Via the output channel 430, the signal encoder 402 can provide or relay the resultant signal 540 to the instrumentation component 416, among others.

With the application of the activation signals 505 and 510 and control signal 515, the instrumentation component 416 can receive or identify the resultant signal 540 outputted via the output channel 430 of the signal encoder 402. Using the resultant signal 540, the instrumentation component 416 can determine the operational characteristics of the sensor 300 (or the hydrophone channel). In determining the operational characteristics, the instrumentation component 416 can compare the time-series data of the control signal 515 used to generate the test signal 535 with the time-series data of the resultant signal 540. By comparing, the instrumentation component 416 can calculate the impedance of the sensor 300, such as resistance (e.g., as modeled by resistor 365), the capacitance (e.g., as modeled by the capacitor 360), and the inductance.

The instrumentation component 416 can also convert the time-series data of both the control signal 515 and the resultant signal 540 to frequency domain representations. Based on comparing the frequency domain representations, the instrumentation component 416 can determine the frequency response of the sensor 300. In calculating the impedance or the frequency response of the sensor 300, the instrumentation component 416 can factor out the predetermined impedances (e.g., known from manufacturing specifications) of the other components of the system 400, such as the impedance bank 408, the switches 456-462 of the switch component 410, the input filter network 404, and the internal components of the signal encoder 402 and the test signal generator 406, among others. The system 400 can configure the DAC unit 442 to output a 0.488 Hz sine wave of 5 V peak to peak between 452 and 454. The switch 460 can be configured to connect test signal 535 to the sensor 300 via the first terminal 310. The switches 456 and 458 can be configured to pass the signal received from the other side of the hydrophone through the second terminal 315 to the first path 525 and the input of signal encoder 402. The switch 462 can be configured to connect the terminals 452 and 454 to the opposite polarity input of the signal encoder 402. Data samples can be collected by the instrumentation component 416.

The instrumentation component 416 can calculate the RMS amplitude of the data collected and can assign the RMS amplitude to $V_{ADC}$. The expected signal amplitude expected for the DAC unit 442 with the settings used is assigned to $V_{TS}$. The steps above can be repeated with the behavior of switch pairs 460/462 and 456/458 swapped. If the values calculated for $Z_H$ in either case is out of acceptable range then the hydrophone can be flagged.

Using the calculated impedance, the instrumentation component 416 can determine whether sensor 300 is properly functioning. The instrumentation component 416 can compare the measured impedance for the sensor 300 to a threshold value. The threshold value can demarcate an expected value of the impedance in a properly functioning hydrophone channel (including the sensor 300), and can range between 20-40 MΩ. When the difference is greater the threshold value, the instrumentation component 416 can determine that the sensor 300 is not properly functioning. On the other hand, when the difference is less than or equal to the threshold value, the instrumentation component 416 can determine that the sensor 300 is properly functioning. The instrumentation component 416 can transmit or communicate the testing state (e.g., the first testing operational state 500), the determined impedance, and the determination of whether the sensor 300 is properly functioning via the transceiver 240 of the housing 200 of the apparatus 140.

Figure 6:
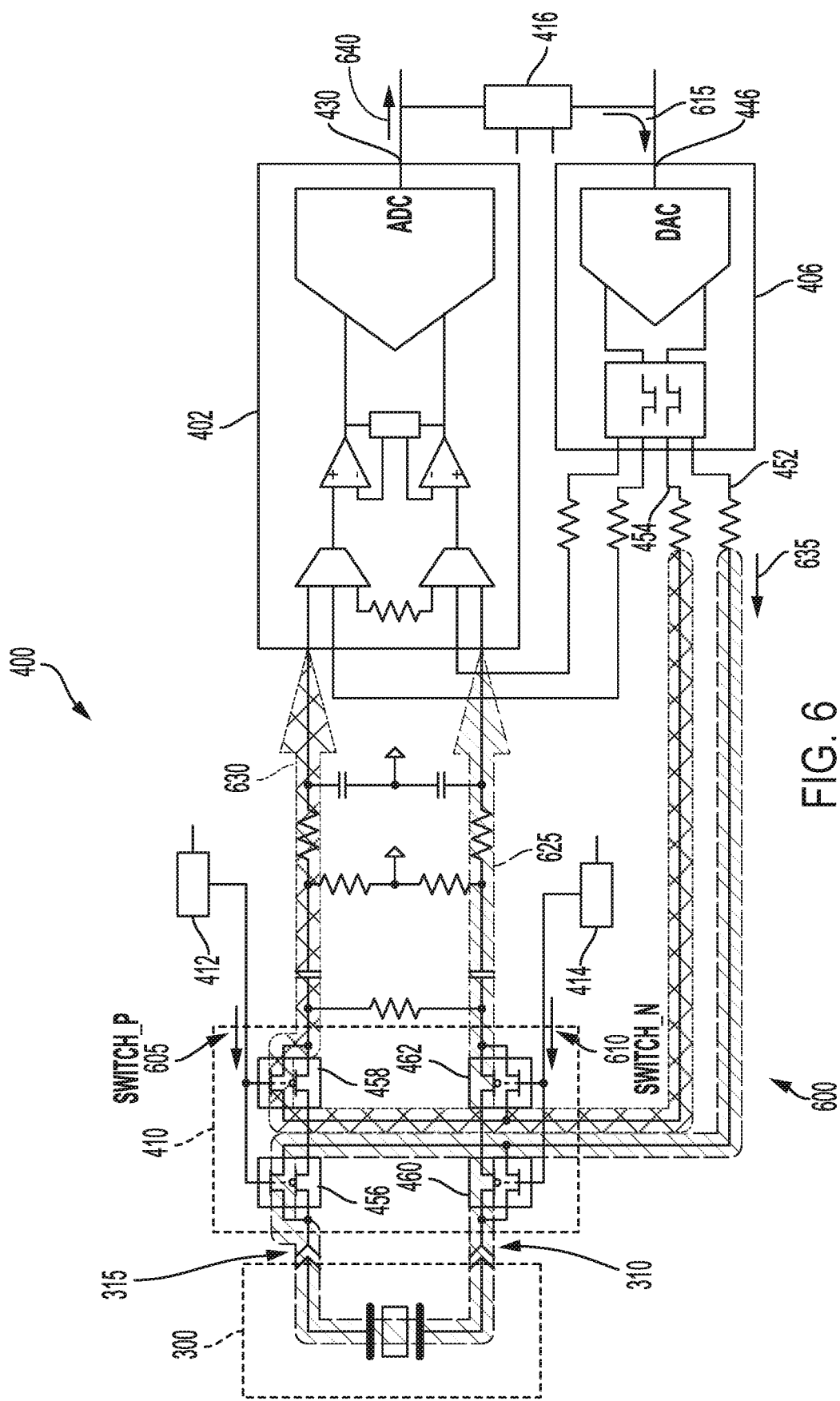
FIG. 6 depicts a circuit diagram of an example system to measure hydrophone impedance in a second operational mode.

FIG. 6, among others, depicts a circuit diagram of the system 400 to measure hydrophone impedance in a second testing operational state 600. The second testing operational state 600 can facilitate the measurement of the operational characteristics of the sensor 300 in one path or direction. The second testing operational state 600 can specify that the first terminal 452 of the test signal generator 406 is to be coupled with the second terminal 315 of the sensor 300. The second testing operational state 600 can also specify that the second terminal 454 of the test signal generator 406 is to be coupled with one of the terminals of the input channel 418 of the signal encoder 402. Upon identifying the operational state of the system 400 as the second testing operational state 600, the instrumentation component 416 can apply one or more activation signals to the switch component 410 via the switch controls 412 and 414 to couple the first terminal 452 of the test signal generator 406 with the second terminal 315 of the sensor 300.

The instrumentation component 416 can generate and apply at least one activation signal 605 (e.g., depicted as "SWITCH_P" signal) to the switches 456 and 458 of the switch component 410 via the first switch control 412. For example, the instrumentation component 416 can relay the activation signal 605 to the first switch control 412 to operate the first switch control 412 in the second testing operational state 600. The first switch control 412 can in turn relay the activation signal 605 to each of the gate terminals of the field-effect transistors in the switches 456 and 458. The activation signal 605 can specify that the switch 456 is to couple the second terminal 315 of the sensor 300 with the first terminal 452 of the test signal generator 406 via the switch 456 itself. The activation signal 605 can also specify that the switch 458 is to couple the second terminal 454 of the test signal generator 406 with one of the terminals of the input channel 418 of the signal encoder 402 via the switch 458 itself.

Concurrently with the application of the activation signal 605 (e.g., within nanoseconds or microseconds), the instrumentation component 416 can generate and apply at least one activation signal 610 (e.g., depicted as "SWITCH_N" signal) to the switches 460 and 462 of the switch component 410 via the second switch control 414. For example, the instrumentation component 416 can relay the activation signal 610 to the second switch control 414 to operate the second switch control 414 in the second testing operational state 600. The second switch control 414 can in turn relay the activation signal 610 to each of the gate terminals of the field-effect transistors in the switches 460 and 462. The activation signal 610 can specify that the switch 460 is to couple the first terminal 310 of the sensor 300 with one of the terminals of the input channel 418 of the signal encoder 402 via the switch 462. The activation signal 610 can also specify that the switch 462 is to couple the first terminal 310 of the sensor 300 with the same terminal of the input channel 418 of the signal encoder 402 via the switches 460 and 462. The terminal of the input channel 418 coupled via the switch 460 can differ from the terminal of the input channel 418 coupled via the switch 458 (e.g., as depicted).

With the application of the activation signals 605 and 610, the switch component 410 can form a first path 625 and a second path 630 between the test signal generator 406 and the signal encoder 402 through the sensor 300, the switch component 410 itself, and the input filter network 404, among others. The first path 625 can define an electrical connection between: the first terminal 452 of the test signal generator 406, through the switch 456, the second terminal 315 of the sensor 300, the first terminal 310 of the sensor 300, the switches 460 and 462 of the switch component 410, the input filter network 404, and then to one of the terminals of the input channel 418 at the signal encoder 402. The second path 630 can define an electrical connection between: the second terminal 454 of the test signal generator 406, through the switch 458 of the switch component 410, the input filter network 404, and then to the opposite terminal of the input channel 418 at the signal encoder 402.

In conjunction with the applications of the activation signals 605 and 610, the instrumentation component 416 can generate and provide at least one control signal 615 to the test signal generator 406. The control signal 615 can indicate a state for the test signal generator 406, such an active state (also referred herein to as an on state) or an inactive state (also referred herein to as an off state). Upon identifying the operational state of the system 400 as not the normal operating state, the instrumentation component 416 can generate the control signal 615 to indicate the state of the test signal generator 406 as the active state. Otherwise, upon identifying the operational state of the system 400 as not the normal operating state, the instrumentation component 416 can generate the control signal 615 to indicate the state of the test signal generator 406 as the inactive state. Additionally, the instrumentation component 416 can generate the control signal 615 to include time-series data (or instructions) for generating at least one test signal 635 to measure the operational characteristics of the sensor 300 (or the hydrophone channel). The time-series data of the control signal 615 can be a digital signal. The time-series data can specify or define the characteristics of the test signal 635 to be generated by the test signal generator 406, such as an amplitude, a period, a frequency, a duration, and a signal waveform, among others. With generation, the instrumentation component 416 can provide the control signal 615 to the test signal generator 406.

Upon receipt from the instrumentation component 416, the test signal generator 406 can parse the control signal 615. In parsing the control signal 615, the test signal generator 406 can identify the specified state. When the specified state is identified as inactive, the test signal generator 406 can restrict or cease, or may not generate any test signal 635 to send through the sensor 300. On the other hand, when the specified state is identified as active, the test signal generator 406 can parse and identify the time-series data of the control signal 615. The test signal generator 406 can generate the test signal 635 in accordance with the time-series data of the control signal 615. The test signal 635 can be used to measure the operational characteristics of the sensor 300 (or the hydrophone channel), such as impedance. The test signal generator 406 can generate the test signal 635 to have the characteristics specified by the control signal 615, such as an amplitude, a period, a frequency, a duration, and a signal waveform, among others. The amplitude of the test signal 635 can have a maximum of 635 V+/−1.25 V. The frequency of the test signal 635 can range between 2048 to 4 milliseconds. The signal waveform for the test signal 635 can include a saw tooth wave, sine wave, a square wave, a triangle wave, and a linear chirp, and a geometric chirp, among others.

With the generation in accordance with the control signal 615, the test signal generator 406 can send, convey, or provide the test signal 635 via the first path 625 (or the second path 630). Furthermore, with the applications of the activation signals 605 and 610, the switch component 410 can route the test signal 635 from the test signal generator 406, through the second terminal 315 of the sensor 300, then the first terminal 310 of the sensor 300, and then to one of terminals of the input channel 418 of the signal encoder 402 (e.g., through the first path 625 as depicted). Upon arrival of the test signal 635 that has traversed through the first path 625, the signal encoder 402 can convert the test signal 635 from the analog domain to the digital domain and can generate a resultant signal 640. The resultant signal 640 can be generated by the signal encoder 402 using the same functionality to generate the signal 468. The resultant signal 640 can be digital domain representation of the test signal 635 when received by the signal encoder 402, and can include time-series data corresponding to the test signal 635 in the digital domain. Via the output channel 430, the signal encoder 402 can provide or relay the resultant signal 640 to the instrumentation component 416, among others.

With the application of the activation signals 605 and 610 and control signal 615, the instrumentation component 416 can receive or identify the resultant signal 640 outputted via the output channel 430 of the signal encoder 402. Using the resultant signal 640, the instrumentation component 416 can determine the operational characteristics of the sensor 300 (or the hydrophone channel). In determining the operational characteristics, the instrumentation component 416 can compare the time-series data of the control signal 615 used to generate the test signal 635 with the time-series data of the resultant signal 640. By comparing, the instrumentation component 416 can calculate the impedance of the sensor 300, such as resistance (e.g., as modeled by resistor 365), the capacitance (e.g., as modeled by the capacitor 360), and the inductance.

The instrumentation component 416 can also convert the time-series data of both the control signal 615 and the resultant signal 640 to frequency domain representations. Based on comparing the frequency domain representations, the instrumentation component 416 can determine the frequency response of the sensor 300. In calculating the impedance or the frequency response of the sensor 300, the instrumentation component 416 can factor out the predetermined impedances (e.g., known from manufacturing specifications) of the other components of the system 400, such as the impedance bank 408, the switches 456-462 of the switch component 410, the input filter network 404, and the internal components of the signal encoder 402 and the test signal generator 406, among others.

Using the calculated impedance, the instrumentation component 416 can determine whether sensor 300 is properly functioning. The instrumentation component 416 can compare the measured impedance for the sensor 300 to a threshold value. The threshold value can demarcate an expected value of the impedance in a properly functioning hydrophone channel (including the sensor 300), and can range between 20-40 MΩ. When the difference is greater the threshold value, the instrumentation component 416 can determine that the sensor 300 is not properly functioning. On the other hand, when the difference is less than or equal to the threshold value, the instrumentation component 416 can determine that the sensor 300 is properly functioning. The instrumentation component 416 can transmit or communicate the testing state (e.g., the second testing operational state 600), the determined impedance, and the determination of whether the sensor 300 is properly functioning via the transceiver 240 of the housing 200 of the apparatus 140.

By setting the system 400 to the first testing operational state 500 and the second testing operational state 600, the instrumentation component 416 can perform a dual polarity test in determining the impedance of the sensor 300 (or the hydrophone channel). The first testing operational state 500 may be performed subsequent or prior to the second testing operational state 600. Likewise, the determination of the impedance of the sensor 300 in the first testing operational state 500 may be performed subsequent or prior to the determination of the impedance of the sensor 300 in the second testing operational state 600. Because the test signal generator 406 can be coupled in series with the sensor 300 the signal encoder 402 via the input filter network 404, the system 400 can test and measure the impedance of the hydrophone channel in both directions (e.g., the paths 525 and 625). This configuration can allow for greater sensitivity in the leakage resistance of the sensor 300 measured (ranging from 0Ω to 20 MΩ), as well lower range of frequencies (ranging from 0.1 Hz to 50 Hz) in the test signals 535 and 635 to measure the impedance.

From performing the two testing operational state 500 and 600, the instrumentation component 416 can compare the impedance of the sensor 300 tested in the first testing operational state 500 with the impedance of the sensor 300 in the second testing operational state 600. By comparing, the instrumentation component 416 can calculate or determine a difference between the determined impedances. In addition, the instrumentation component 416 can determine whether the sensor 300 (or the hydrophone channel) is imbalanced by comparing the difference to a threshold value. The threshold value can delineate properly functioning hydrophones (including the sensor 300), and can range between 10-30 MΩ. When the difference is greater the threshold value, the instrumentation component 416 can determine that the sensor 300 is imbalanced. On the other hand, when the difference is less than or equal to the threshold value, the instrumentation component 416 can determine that the sensor 300 is balanced. The instrumentation component 416 can transmit or communicate the determined difference in the impedances and the determination of whether the sensor 300 is balanced via the transceiver 240 of the housing 200 of the apparatus 140.

Figure 7:
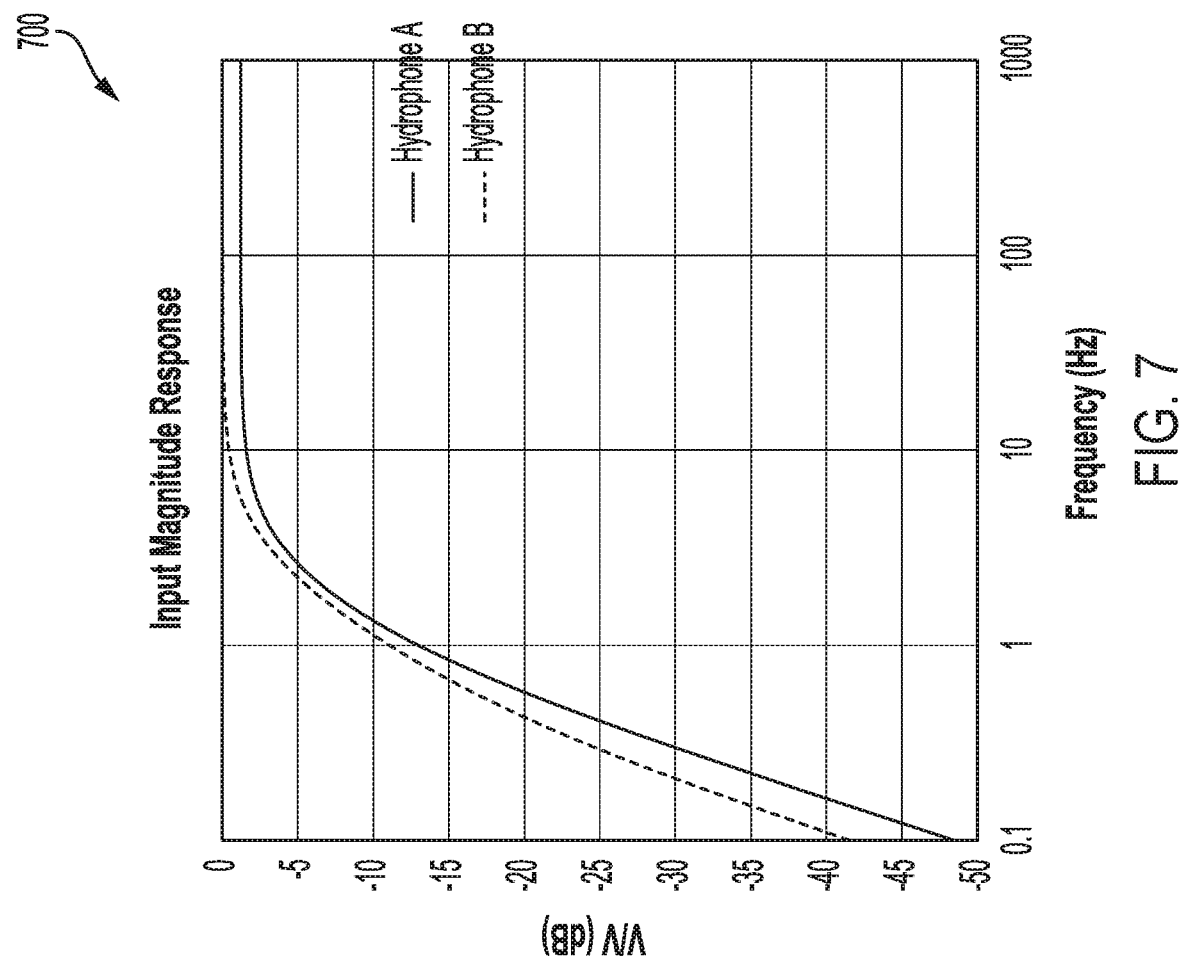
FIG. 7 depicts a graph of an input magnitude response of a hydrophone channel under simulated conditions.

FIG. 7 depicts a graph 700 of an input magnitude response of two example hydrophone channels (hydrophone "A" and hydrophone "B") under simulated conditions. The simulation conditions for the graph 700 can include a 10 nF capacitor and a 1 TΩ parallel resistor. As depicted, the amplitude response for both hydrophones may be similar, but hydrophone "A" may have a 1.2 dB insertion loss not apparent in hydrophone "B".

Figure 8:
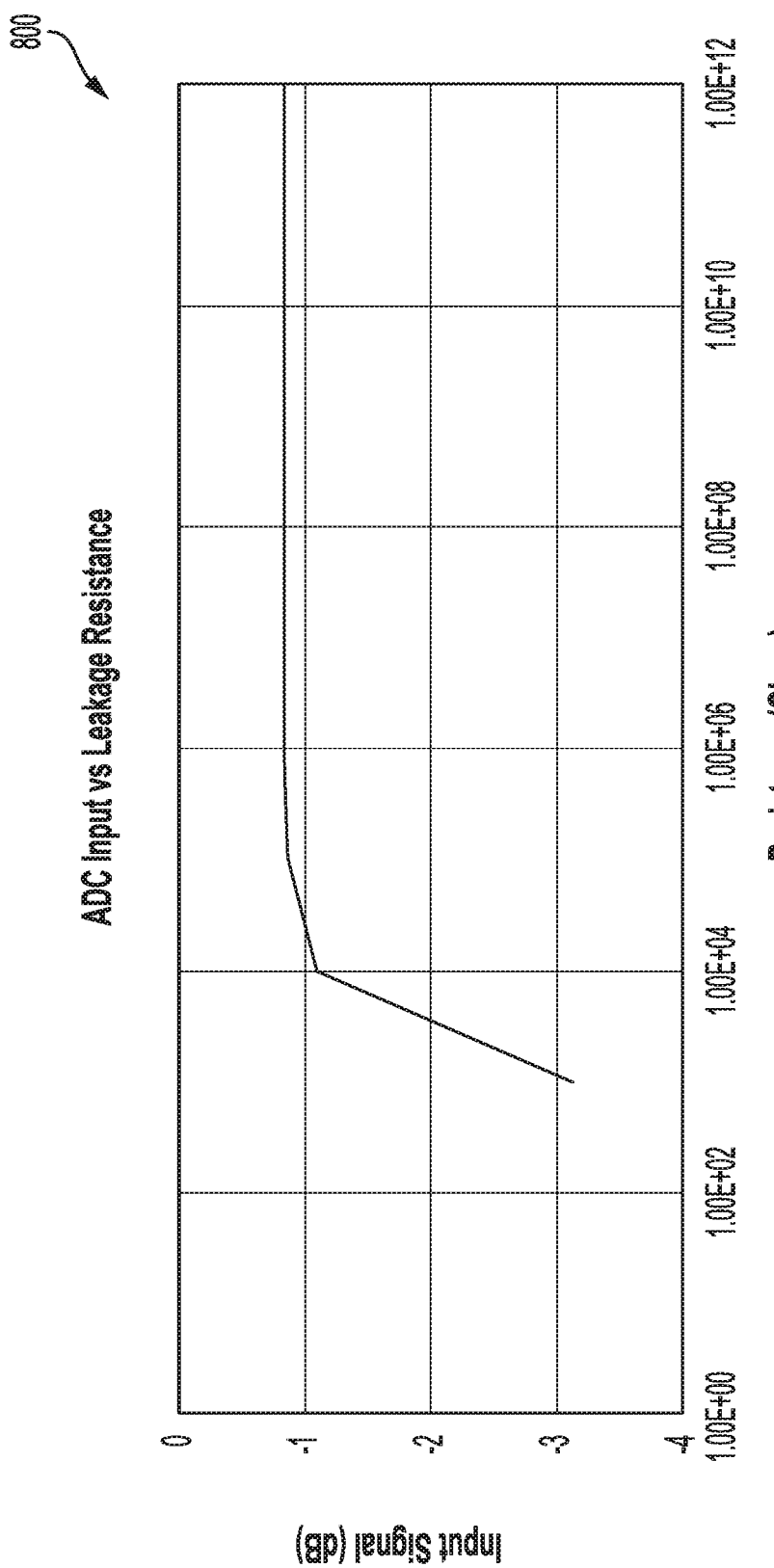
FIG. 8 depicts a graph of input signal versus leakage resistance of a hydrophone channel under simulated conditions.

FIG. 8 depicts a graph 800 of input signal versus leakage resistance of a hydrophone channel under simulated conditions. In a properly functioning hydrophone, the signal level at the input of a signal encoder may be the same as an open input. The simulated conditions may include another approach for testing the impedance of the hydrophone channel, in which a test signal generator may be connected in parallel as opposed to in series in FIGS. 4-6. With sensor coupled in parallel, the signal encoder input may largely function as a voltage divider between the test signal generator output impedance which is on the order of 300Ω and the parallel combination of the hydrophone and the channel input which is typically in the MΩ. The output impedance of the test signal generator may be about 5Ω. Under this approach using a test signal of 31.25 Hz, only when the leakage reaches 100 kΩ can the change in signal level be readily detected.

Figure 9:
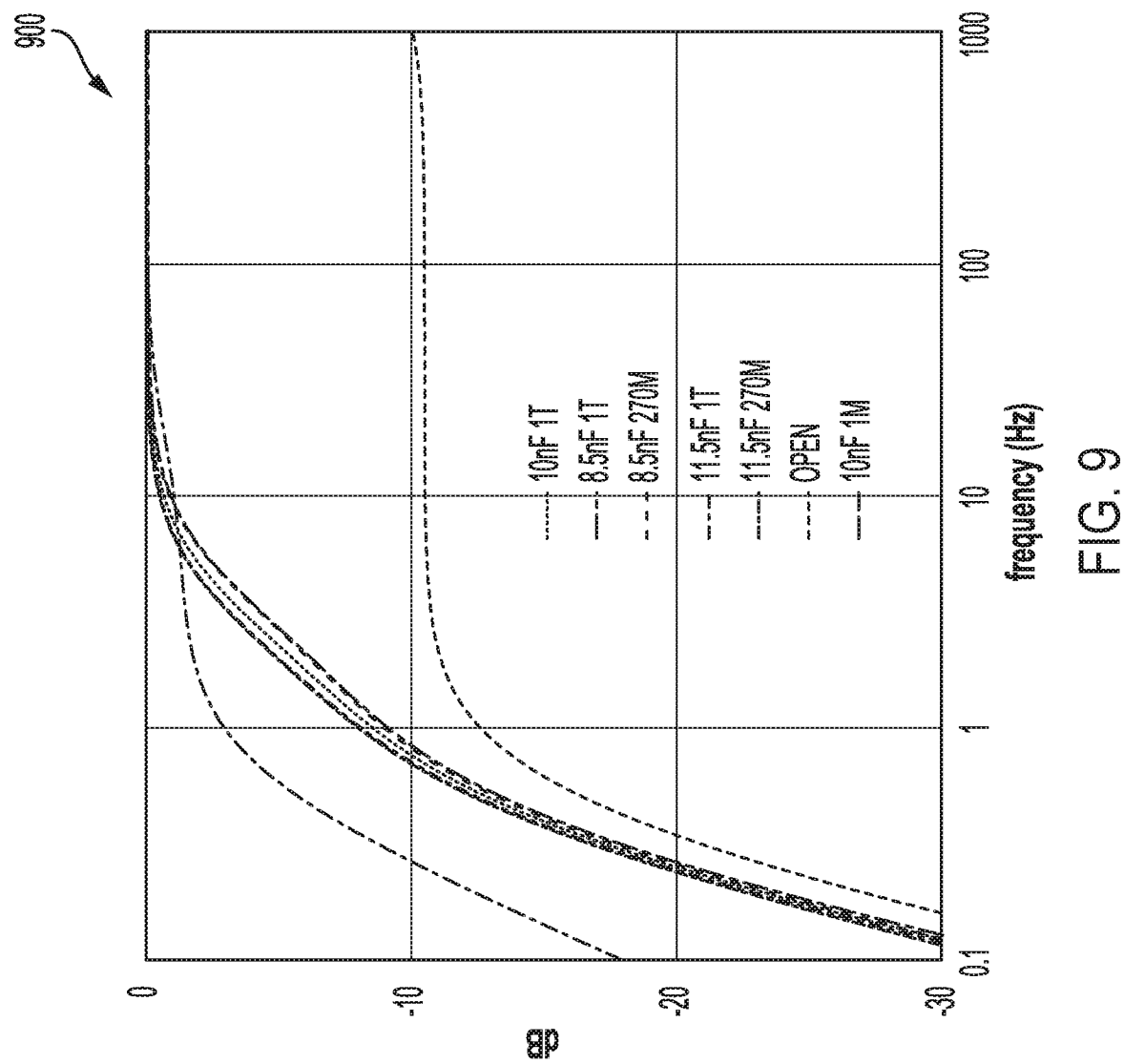
FIG. 9 depicts a graph of an input signal frequency versus leakage resistance of a hydrophone channel under simulated conditions.

FIG. 9 depicts a graph 900 of an input signal frequency versus leakage resistance of a hydrophone channel under simulated conditions. The simulated conditions may include using the system 400 with the test signal generator coupled in series with the hydrophone channel. Under this approach, it may now be possible to identify a defective channel that has either a high or low impedance. The center grouping of lines as depicted may indicate the spread due to variations of properly functioning hydrophone that satisfy expected behaviors. The upper line may represent a defective hydrophone due to low impedance with a leakage resistance of 1 MΩ. The lower line may represent a defective hydrophone due to high impedance with no hydrophone attached.

Figure 10:
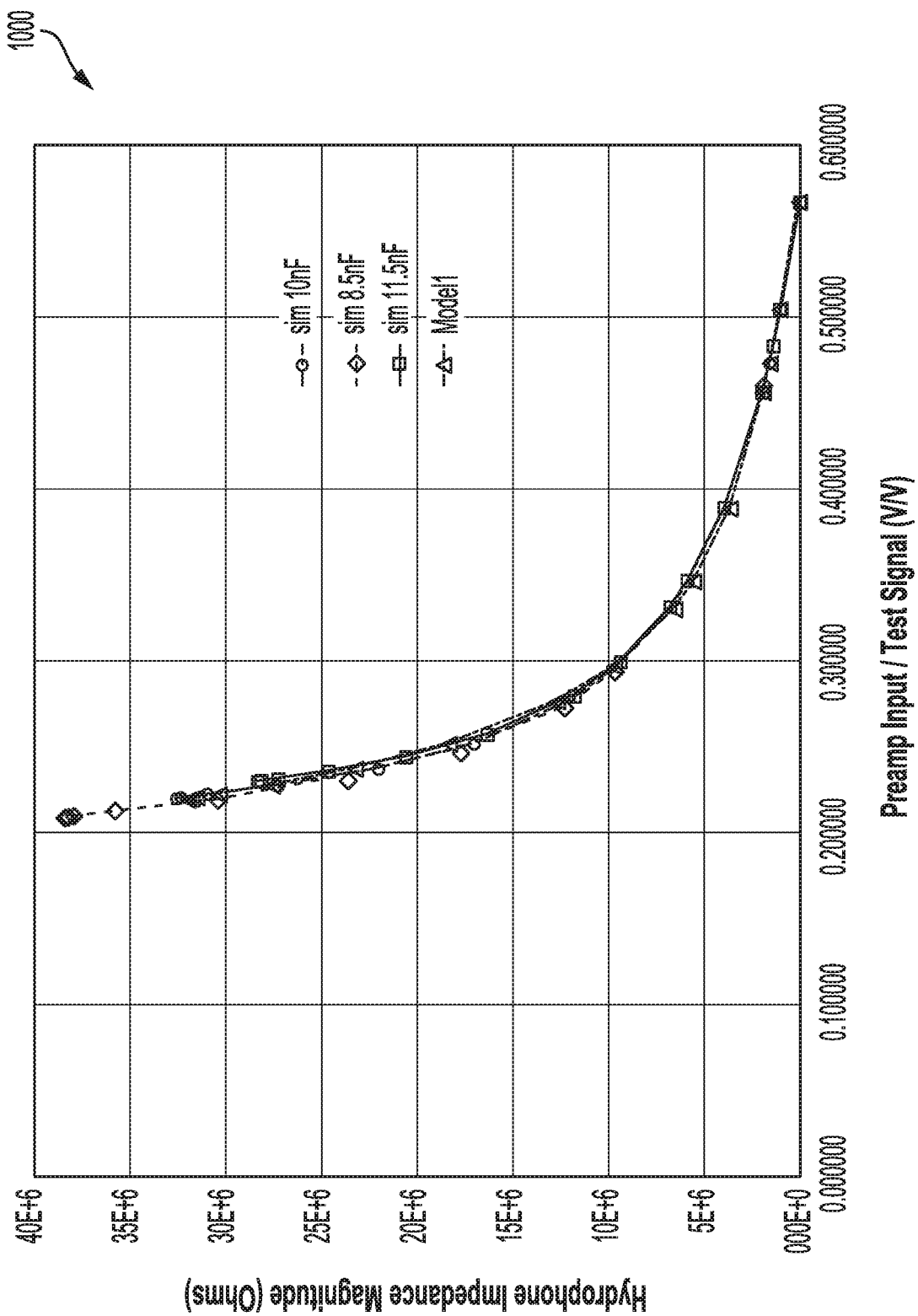
FIG. 10 depicts a graph of an input signal versus impedance of a hydrophone channel under simulated conditions.

FIG. 10 depicts a graph 1000 of an input signal versus impedance of a hydrophone channel under simulated conditions. The simulation results depicted may be used to determine the maximum impedance for a properly working hydrophone. The simulated conditions may include using the system 400 with a test signal having a frequency of 0.488 Hz, with three different values for the hydrophone capacitance: 8.5, 10, and 11.5 nF. For each capacitance value went through leakage resistance values from 10 GΩ to 1MΩ, 0 and ∞. A third-order equation may be used to characterize the behavior:

$$Z_H = A_3 \left(\frac{V_{TS}}{V_{ADC}}\right)^3 + A_2 \left(\frac{V_{TS}}{V_{ADC}}\right)^2 + A_1 \left(\frac{V_{TS}}{V_{ADC}}\right) + A_O$$

where:
$A_3$=1317561.35864472
$A_2$=−8143282.26893616
$A_1$=20941671.7630004
$A_0$=−18697085.9892959

The plot may represent the effective hydrophone impedance, capacitor $X_C$ in parallel with the leakage resistance, versus the voltage at the signal encode input. The resultant range of hydrophone impedances is from 0 to about 38 MΩ. From the simulations, the maximum impedance for a properly functioning hydrophone may be 40 MΩ. The impedance ($X_C$) for the hydrophone at 0.488 Hz is 28.3 MΩ to 38.3 MΩ over the capacitance range of 10 nF+/−15%. An open hydrophone input results in a $V_{ADC}/V_{TS}$ ratio of about 0.146 (−16.72 dB) which would be converted to an impedance of 166 MΩ.

Figure 11:
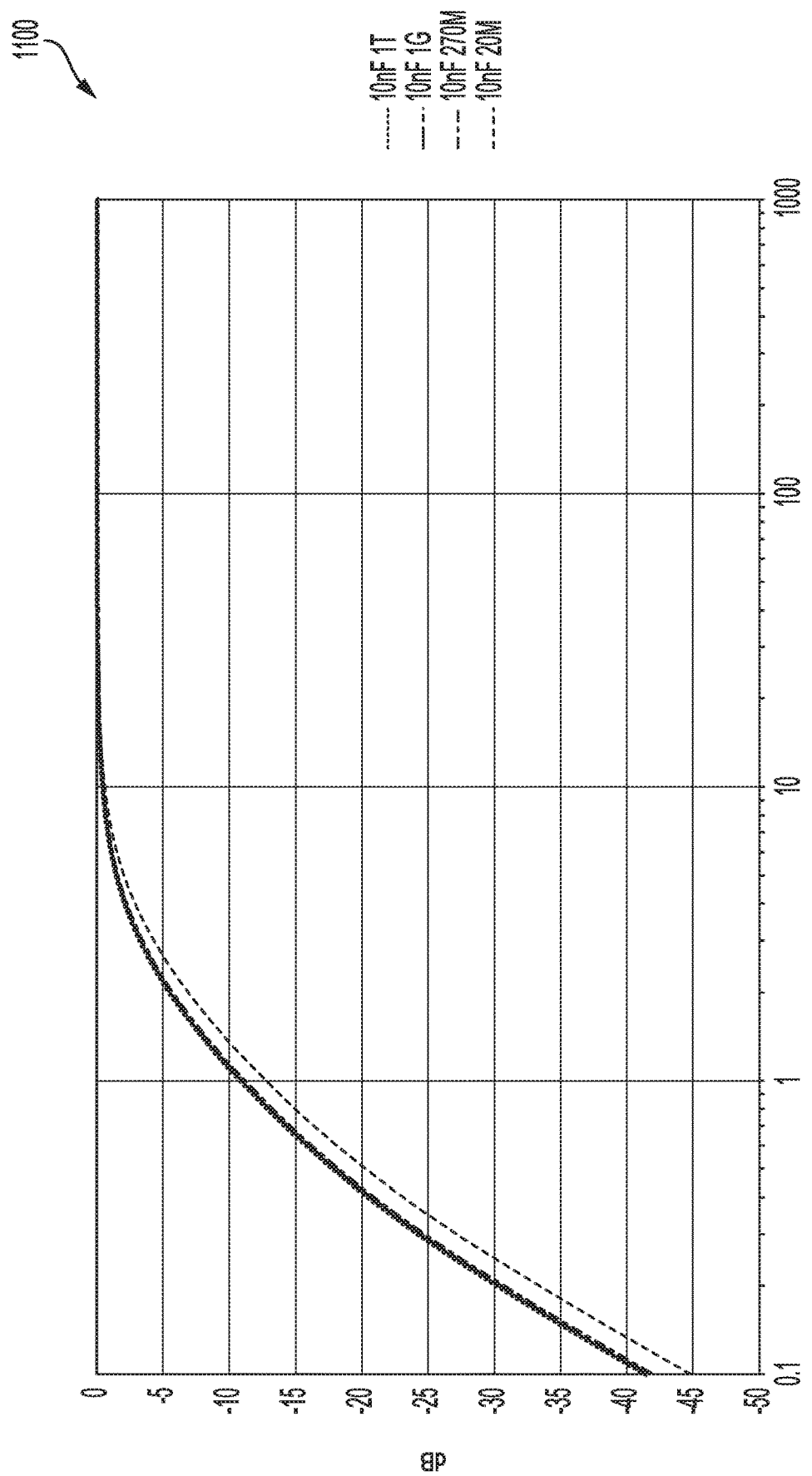
FIG. 11 depicts a graph of an input signal versus impedance of a hydrophone channel under simulated conditions.

FIG. 11 depicts a graph 1100 of an input signal versus impedance of a hydrophone channel under simulated conditions. The simulation results depicted may be used to determine the minimum impedance for a properly working hydrophone. The simulated conditions may include using the system 400 with a test signal having a frequency, with different values for the hydrophone capacitance and leakage resistance: 10 nF and 1 TΩ. 10 nF and 1 GΩ, 10 nF and 270MΩ, and 10 nF and 20MΩ. As shown, the tolerance for the hydrophone sensitivity is +/−1 dB. A 20 MΩ leakage may result in an impedance of 17.05 MΩ (−11.963 dB & 0.252249 V/V), contrary to the simulations that return a result of 18.4 MΩ for that signal level. From the simulations, the minimum impedance for a properly functioning hydrophone may be 18.4 MΩ. A leakage resistance of 20 MΩ across the phone may result in a 1 dB loss at 3 Hz in normal acquisition. The hydrophone can have a sensitivity tolerance of +/−1 dB. A leakage resistance of 20 MΩ can results in a sensitivity loss of 1 dB. The impedance of a 20 nF hydrophone in parallel with a 20 MΩ leakage resistance is 17 MΩ. A measured hydrophone impedance of 17 MΩ can be a pass-fail limit.

Based on the simulations, the impedance limits for a properly functioning hydrophone may range between 20 MΩ and 40 MΩ when either the "SWITCH_N" or "SWITCH_P" is activated for the test. A connection from one terminal of the sensor to ground may result in an undesirable impedance only if the FETs on that terminal are activated. To detect this imbalanced ground fault, the sensor may be tested in both polarities as detailed herein.

Figure 12:
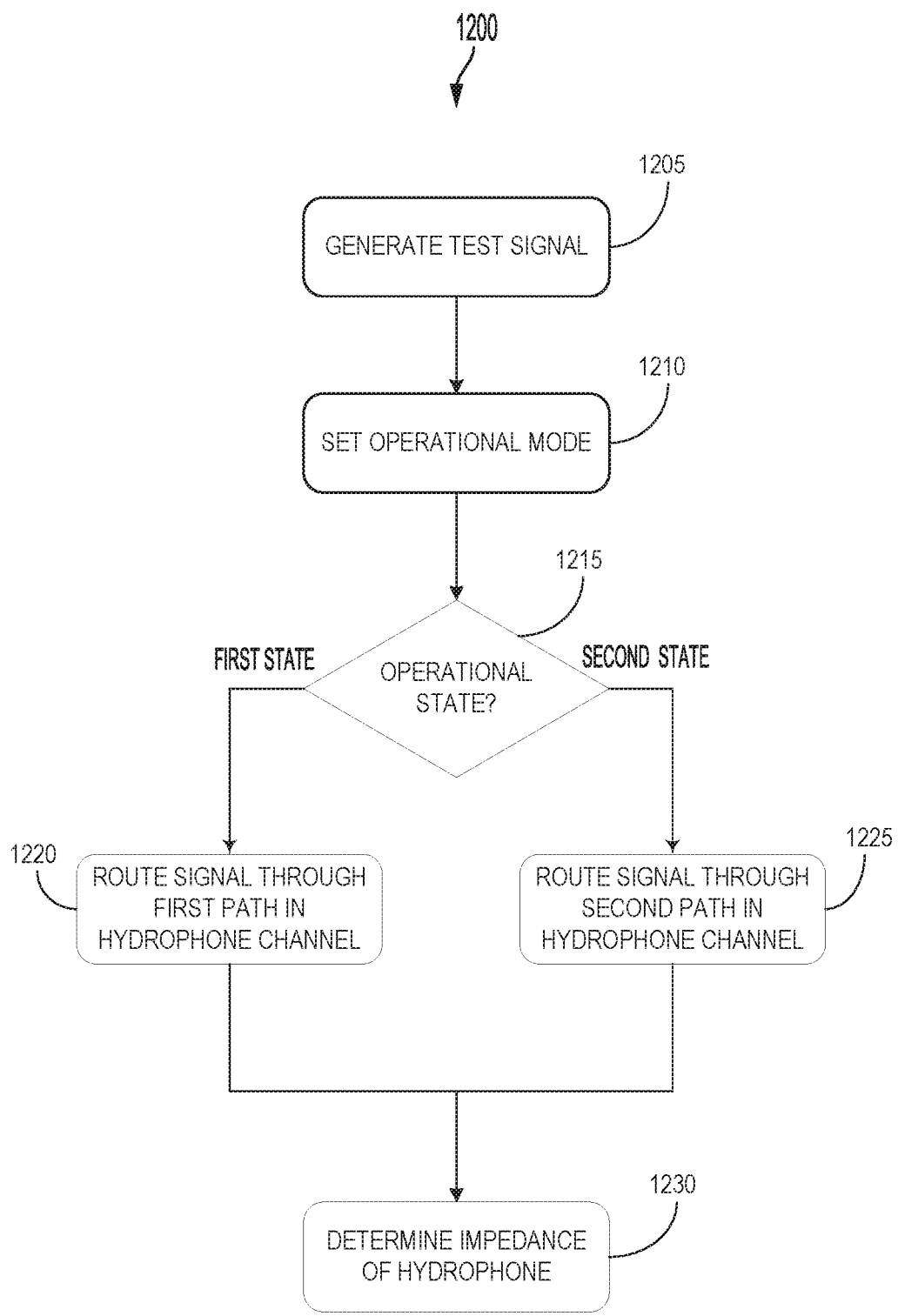
FIG. 12 depicts a flow diagram of an example method of measuring hydrophone impedance.

FIG. 12, among others, depicts a flow diagram of a method 1200 of measuring hydrophone impedance. The method 1200 can be performed or implemented using any of the components described herein in conjunction with FIGS. 1-6 and 14. The method 1200 can include generating a test signal 535 or 635 (1205). A test signal generator 406 of an electronic circuit or system 400 can generate the test signal 535 or 635 to measure an impedance of the sensor 300, such as a resistance, a capacitance, or an inductance, among others. The test signal 535 or 635 can have one or more characteristics defined or set via a control signal 515 or 615 from an instrumentation component 416. The characteristics of the test signal 535 or 635 can include, for example, an amplitude, a period, a frequency, a duration, and a signal waveform, among others. Upon generation, the test signal generator 406 can convey or send the test signal 535 or 635.

The method 1200 can include setting an operational state (1210). The operational state can define or specify the flow of electric signals through the system 400 from the sensor 300 to the signal encoder 402. The operational states can include a normal operational state, a first testing operational state 500, and the second testing operational state 600. The operational state can be set via the instrumentation component 416 to measure the impedance of the sensor 300.

The method 1200 can include determining an operational state (1215). The instrumentation component 416 can identify or determine the operational state set for the system 400. The instrumentation component 416 can determine the operational state as the normal operational state. Under the normal operational state, the instrumentation component 416 can apply activation signals to the switch component 410 via switch controls 412 and 414 to uncouple the test signal generator 406 from the sensor 300 and the signal encoder 402. The electric signal 325 from the sensor 300 can flow through the input filter network 404 to the signal encoder 402, without traversing the test signal generator 406.

The method 1200 can include routing the test signal 535 through a path 525 in a hydrophone channel, when the operational mode is determined to be the first testing operational state 500 (1220). Under the first testing operational state 500, the instrumentation component 416 can apply activation signals 505 and 510 to the switch component 410 via the switch controls 412 and 414. With the application of the activation signals 505 and 510, the switch component 410 can route the test signal 535 from the test signal generator 406 through the first terminal 310 of the sensor 300, the second terminal 315 of the sensor 300, and then to the signal encoder 402 via the input filter network 404. The test signal generator 406 can also generate the test signal 535 in accordance with specifications of a control signal 515 from the instrumentation component 416.

The method 1200 can include routing the test signal 635 through a path 625 in a hydrophone channel, when the operational mode is determined to be the second testing operational state 600 (1225). Under the second testing operational state 600, the instrumentation component 416 can apply activation signals 605 and 610 to the switch component 410 via the switch controls 412 and 414. With the application of the activation signals 605 and 610, the switch component 410 can route the test signal 635 from the test signal generator 406 through the second terminal 315 of the sensor 300, then the first terminal 310 of the sensor 300, and then to the signal encoder 402 via the input filter network. The test signal generator 406 can also generate the test signal 635 in accordance with specifications of a control signal 615 from the instrumentation component 416.

The method 1200 can include determining an impedance of the hydrophone (1230). The instrumentation component 416 can identify a resultant signal 540 or 640 outputted by the signal encoder 402. The instrumentation component 416 can compare time-series data in the resultant signal 540 or 640 with time-series data of the control signals 515 or 615 used to generate the test signal 535 or 635. Based on the comparison, the instrumentation component 416 can calculate or determine the impedance of the sensor 300 (or the hydrophone channel). The instrumentation component 416 can also determine whether the sensor 300 is properly functioning and whether the sensor 300 is balanced using the determination of the impedances in the first testing operational state 500 and the second testing operational state 600.

Figure 13:
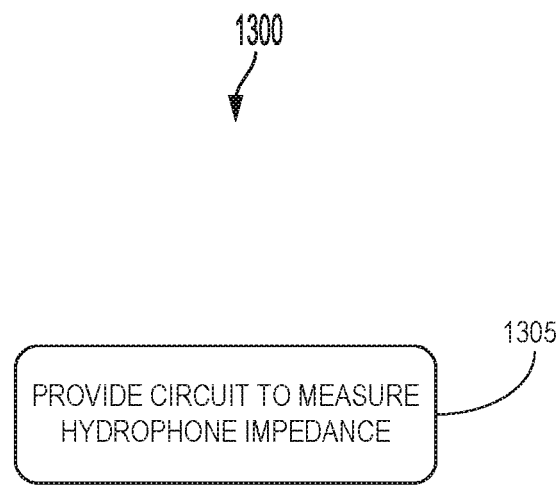
FIG. 13 depicts a flow diagram of an example method of providing an apparatus to measure hydrophone impedance.

FIG. 13, among others, depicts a flow diagram of a method 1300 of providing an apparatus to measure hydrophone impedance. The method 1300 can include providing the electric circuit or the system 400 to measure hydrophone impedance (1350). The electric circuit or the system 400 can be disposed in a housing 200 of an apparatus 140 to perform seismic operations in deep water 105. The system 400 can include a sensor 300. The sensor 300 can convert an acoustic signal 320 traveling via the water 105 into an electric signal 325. The system 400 can include an input filter network 404 coupled in parallel with sensor 300. The input filter network 404 can perform a filtering operation to the electric signal 325 as the electric signal 325 passes through the input filter network 404. The system 400 can include a signal encoder 402 coupled in parallel with the input filter network 404 to receive the electric signal 325 from the sensor 300. The signal encoder 402 can convert the electric signal 325 to a resultant signal 468 corresponding to a digital representation of the electric signal 325.

The system 400 to be provided can include a test signal generator 406 that can be coupled in series with the sensor 300 and the signal encoder 402 via the input filter network 404. The test signal generator 406 can generate a test signal 535 or 635 to send via the sensor 300 (and the hydrophone channel). The system 400 can include a switch component 410 coupled in series between the sensor 300 and the signal encoder 402 via the input filter network 404. Based on the operational state, the switch component 410 can control coupling of the test signal generator 406 with the sensor 300 and route electric signals through the system 400. When in the normal operational state, the switch component 410 can route electric signal 325 from the sensor 300 to the signal encoder 402 via the input filter network 404.

When in the first testing operational state 500, the switch component 410 can route the test signal 535 from the test signal generator 406, through a first terminal 310 of the sensor 300 then to a second terminal 315 of the sensor 300, and then to the signal encoder 402 via the input filter network 404. When in the second testing operational state 600, the switch component 410 can route the test signal 635 from the test signal generator 406, through the second terminal 315 of the sensor 300, then the first terminal 310 of the sensor 300, and then to the signal encoder 402. The system 400 to be provided can include an instrumentation component 416. The instrumentation component 416 can control the operations of the switch component 410 via switch controls 412 and 416. The instrumentation component 416 can also determine the impedance of the hydrophone channel based on the resultant signal 540 or 640 received via the signal encoder 402 during the first testing operational state 500 and the second testing operational state 600 respectively.

FIG. 14 depicts a block diagram of an architecture for a computing system employed to implement various elements of the systems (e.g., the signal encoder 402, the input filter network 404, the test signal generator 406, the switch controls 412 and 414, and the instrumentation component 416) and methods depicted in FIGS. 4-6, 12, and 13. The computing system 1400 includes a bus 1405 or other communication component for communicating information and a processor 1410 or processing circuit coupled to the bus 1405 for processing information. The computing system 1400 can also include one or more processors 1410 or processing circuits coupled to the bus for processing information. The computing system 1400 also includes main memory 1415, such as a random access memory (RAM) or other dynamic storage device, coupled to the bus 1405 for storing information, and instructions to be executed by the processor 1410. Main memory 1415 can also be used for storing seismic data, binning function data, images, reports, tuning parameters, executable code, temporary variables, or other intermediate information during execution of instructions by the processor 1410. The computing system 1400 may further include a read only memory (ROM) 1420 or other static storage device coupled to the bus 1405 for storing static information and instructions for the processor 1410. A storage device 1425, such as a solid state device, magnetic disk or optical disk, is coupled to the bus 1405 for persistently storing information and instructions.

The computing system 1400 may be coupled via the bus 1405 to a display 1435 or display device, such as a liquid crystal display, or active matrix display, for displaying information to a user. An input device 1430, such as a keyboard including alphanumeric and other keys, may be coupled to the bus 1405 for communicating information and command selections to the processor 1410. The input device 1430 can include a touch screen display 1435. The input device 1430 can also include a cursor control, such as a mouse, a trackball, or cursor direction keys, for communicating direction information and command selections to the processor 1410 and for controlling cursor movement on the display 1435.

The processes, systems and methods described herein can be implemented by the computing system 1400 in response to the processor 1410 executing an arrangement of instructions contained in main memory 1415. Such instructions can be read into main memory 1415 from another computer-readable medium, such as the storage device 1425. Execution of the arrangement of instructions contained in main memory 1415 causes the computing system 1400 to perform the illustrative processes described herein. One or more processors in a multi-processing arrangement may also be employed to execute the instructions contained in main memory 1415. In some embodiments, hard-wired circuitry may be used in place of or in combination with software instructions to effect illustrative implementations. Thus, embodiments are not limited to any specific combination of hardware circuitry and software.

Although an example computing system has been described in FIG. 14, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, microprocessors, and any one or more processors of a digital computer. A processor can receive instructions and data from a read only memory or a random access memory or both. The elements of a computer are a processor for performing actions in accordance with instructions and one or more memory devices for storing instructions and data. A computer can include, or be operatively coupled to receive data from or transfer data to, or both, one or more mass storage devices for storing data, e.g., magnetic, magneto optical disks, or optical disks. A computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The implementations described herein can be implemented in any of numerous ways including, for example, using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein to refer to any type of computer code or set of computer-executable instructions that can be employed to program a computer or other processor to implement various aspects of embodiments as discussed above. One or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Program modules can include routines, programs, objects, components, data structures, or other components that perform particular tasks or implement particular abstract data types. The functionality of the program modules can be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to measure hydrophone impedance, comprising:
    a sensor to convert an acoustic wave received via a liquid medium into an electric signal, wherein the sensor having a first polarity terminal and a second polarity terminal having a polarity opposite of the first polarity terminal;
    a signal encoder coupled with the sensor to receive the electric signal converted by the sensor;
    a test signal generator coupled in series with the sensor and the signal encoder to generate a test signal to send through the sensor and the signal encoder, the test signal to measure an impedance of the sensor;
    a switch component coupled in series with the sensor, the signal encoder, and the test signal generator, wherein the switch component, having a first operational state and a second operational state, is configured to:
        route the test signal from the test signal generator to the first polarity terminal of the sensor, the second polarity terminal of the sensor, and to the signal encoder in response to the switch component set to the first operational state, and
        route the test signal from the test signal generator to the second polarity terminal of the sensor, the first polarity terminal of the sensor, and to the signal encoder in response to the switch component set to the second operational state; and
    an instrumentation component coupled with the signal encoder and the test signal generator, wherein the instrumentation component is configured to:
        measure a first impedance of the sensor using the test signal and a first resultant signal outputted by the signal encoder in response to the test signal during the first operational state; and
        measure a second impedance of the sensor using the test signal and a second resultant signal outputted by the signal encoder in response to the test signal during the second operational state.

2. The system of claim 1, wherein the switch component, having a third operational state, to inhibit passage of the test signal from the test signal generator to the sensor and the signal encoder in response to the switch component set to the third operational state.

3. The system of claim 1, wherein the test signal generator, having an active state and an inactive state, is configured to:
    generate the test signal to send through the sensor and signal encoder in response to the test signal generator set to the active state; and
    restrict sending of the test signal through the sensor and the signal encoder in response to the test signal generator set to the inactive state.

4. The system of claim 1, wherein the switch component comprises a plurality of switches, and wherein each switch of the plurality of switches comprises:
    a first terminal coupled with one of the first polarity terminal or the second polarity terminal of the sensor to receive the electric signal;
    a second terminal coupled with the signal encoder to pass the electric signal or the test signal to the signal encoder; and
    a third terminal coupled with a switch control to receive an activation signal, the activation signal identifying one of the first operational mode or the second operational mode.

5. The system of claim 1, further comprising a switch control, coupled with the switch component, to send an activation signal to the switch component for identifying one of the first operational mode or the second operational mode, wherein receipt of the activation signal causes the switch component to operate in one of the first operational mode or the second operational mode as identified by the activation signal.

6. The system of claim 1, wherein the test signal generator is configured to generate a plurality of test signals, and wherein each test signal of the plurality of test signals having a set frequency to measure the impedance of the sensor at the set frequency ranging from 0.1 Hz to 10 Hz.

7. The system of claim 1, wherein the test signal generator is configured to generate the test signal to send through the sensor and the signal encoder, and wherein the test signal to measure a leakage resistance of the sensor measured with the test signal ranging from 0 Ω to 20 Ω.

8. The system of claim 1, wherein the instrumentation component is configured to:
    identify a first resultant signal outputted by the signal encoder in response to the test signal during the first operational mode;

identify a second resultant signal outputted by the signal encoder in response to the test signal during the second operational mode; and determine the impedance of the sensor using the test signal, the first resultant signal, and the second resultant signal, and predetermined impedance for components between the sensor and the signal encoder.

9. The system of claim 1, wherein the instrumentation component is configured to:

determine a difference in impedance between the first impedance and the second impedance of the sensor.

10. The system of claim 1, further comprising an input filter network coupled in series with the switch component, the signal encoder, and the test signal generator, wherein the input filter network is configured to filter the signal from the sensor.

11. The system of claim 1, wherein the sensor including a piezoelectric transducer, and wherein the piezoelectric transducer is configured to transform a change in pressure in the liquid medium corresponding to the acoustic wave to the electric signal.

12. The system of claim 1, wherein the test signal generator comprises:

a digital-to-analog converter (DAC) to convert a time-series sequence to the test signal to measure the impedance of the sensor; and a plurality of field-effect transistors (FET) coupled with the DAC to couple the DAC in series between the sensor and the signal encoder.

13. A method of measuring hydrophone impedance, comprising:

generating, by a test signal generator, a test signal to send through a sensor and a signal encoder to measure an impedance of the sensor, the sensor to convert an acoustic wave to an electric signal, the sensor having a first polarity terminal and a second polarity terminal having a polarity opposite of the first polarity terminal, the signal encoder coupled in series with the sensor to receive the electric signal;

routing, by a switch component coupled in series with the sensor, the signal encoder, and the test signal generator, the test signal from the test signal generator to the first polarity terminal of the sensor, the second polarity terminal of the sensor, and to the signal encoder in response to the switch component set to a first operational state; and routing, by the switch component, the test signal from the test signal generator to the second polarity terminal of the sensor, the first polarity terminal of the sensor, and to the signal encoder in response to the switch component set to a second operational state;

measuring, by an instrumentation component, a first impedance of the sensor using the test signal and a first resultant signal outputted by the signal encoder in response to the test signal during the first operational state; and measuring, by the instrumentation component, a second impedance of the sensor using the test signal and a second resultant signal outputted by the signal encoder in response to the test signal during or in the second operational state.

14. The method of claim 13, further comprising:

generating, by the test signal generator, the test signal to send through the sensor and signal encoder in response to the test signal generator set to an active state; and restricting, by the test signal generator, sending of the test signal through the sensor and the signal encoder in response to the test signal generator set to an inactive state.

15. The method of claim 13, further comprising:

determining, by the instrumentation component, the impedance of the sensor using the test signal, the first resultant signal, and the second resultant signal, and predetermined impedance for components between the sensor and the signal encoder.

16. The method of claim 13, further comprising:

generating, by the test signal generator, a plurality of test signals, each test signal of the plurality of test signals having a set frequency to measure the impedance of the sensor at the set frequency, the set frequency ranging from 0.1 Hz to 10 Hz.

17. The method of claim 13, further comprising:

setting, by a switch control coupled with the switch component, an activation signal to the switch component, for identifying one of the first operational mode or the second operational mode, wherein receipt of the activation signal to cause the switch component to operate in one of the first operational mode or the second operational mode as identified by the activation signal.

18. An apparatus to measure seismic data, comprising:

a housing;

a hydrophone channel disposed within the housing, comprising:

a sensor to convert an acoustic wave received via a liquid medium into an electric signal;

an input channel to a signal encoder, the input channel coupled in parallel with the sensor to receive the electric signal from the sensor; and an input filter network coupled in parallel between the sensor and the signal encoder to pass the electric signal received from the sensor to the signal encoder; and a test signal generator disposed within the housing, the test signal generator coupled in series with the hydrophone channel between the sensor and the input filter network, the test signal generator to generate a test signal to send through the hydrophone channel, the test signal to measure an impedance of the sensor;

a switch component disposed within the housing, the switch component coupled in series between the sensor and the signal encoder of the hydrophone channel, the switch component having a first operational state and a second operational state, the switch component to:

route the test signal from the test signal generator through the hydrophone channel in a first path in response to the switch component set to the first operational state, and route the test signal from the test signal generator through the hydrophone channel in a second path in response to the switch component set to the second operational state; and an instrumentation component coupled with the signal encoder and the test signal generator, wherein the instrumentation component is configured to:

measure a first impedance of the sensor using the test signal and a first resultant signal outputted by the signal encoder in response to the test signal during the first operational state; and measure a second impedance of the sensor using the test signal and a second resultant signal outputted by the signal encoder in response to the test signal during the second operational state, wherein the measurement of the impedance of the sensor in the first operational state is performed subsequent or prior to measurement of the impedance of the sensor in the second operational state.

19. The apparatus of claim 18, wherein the instrumentation component is configured to:
determine the impedance of the sensor using the test signal, the first resultant signal, and the second resultant signal, and predetermined impedance for the hydrophone channel.

20. The apparatus of claim 18, wherein the test signal generator is configured to generate a plurality of test signals, and wherein each test signal of the plurality of test signals having a set frequency to measure the impedance of the sensor at the set frequency ranging from 0.1 Hz to 10 Hz.

* * * * *